United States Patent
Wilson et al.

(10) Patent No.: US 9,343,103 B2
(45) Date of Patent: *May 17, 2016

(54) SERIAL PORT COMMUNICATION FOR STORAGE DEVICE USING SINGLE BIDIRECTIONAL SERIAL DATA LINE

(71) Applicant: Avago Technologies General IP (Singapore) Pte. Ltd., Singapore (SG)

(72) Inventors: Ross S. Wilson, Menlo Park, CA (US); Daniel J. Dolan, Cottage Grove, MN (US); David W. Kelly, Eagan, MN (US); Richard Rauschmayer, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,467

(22) Filed: Jul. 11, 2014

(65) Prior Publication Data

US 2016/0012846 A1    Jan. 14, 2016

(51) Int. Cl.
| | | |
|---|---|---|
| G11B 20/10 | (2006.01) | |
| G11B 5/09 | (2006.01) | |
| G06F 3/06 | (2006.01) | |
| G11B 5/00 | (2006.01) | |

(52) U.S. Cl.
CPC .......... G11B 20/10027 (2013.01); G06F 3/06 (2013.01); G11B 5/09 (2013.01); G11B 20/10222 (2013.01); *G11B 2005/0021* (2013.01)

(58) Field of Classification Search
CPC ...... G11B 5/09; G11B 5/02; G11B 20/10027; G11B 5/012; G11B 19/02; G11B 20/10222; G11B 2005/0021; G11B 20/10; G11B 20/18; H04N 7/15; H04N 7/152; H04Q 11/04; G06F 3/06
USPC .................... 360/39, 51, 61, 67, 46
See application file for complete search history.

(56) References Cited

U.S. PATENT DOCUMENTS

| | | | | |
|---|---|---|---|---|
| 4,257,098 A | * | 3/1981 | Lacy ...................... | G11B 20/18 367/74 |
| 5,014,267 A | * | 5/1991 | Tompkins ................ | H04N 7/15 348/E7.083 |
| 5,341,249 A | * | 8/1994 | Abbott .................... | G11B 20/10 360/39 |
| 5,872,992 A | | 2/1999 | Tietjen et al. | |
| 6,104,565 A | | 8/2000 | Bruner et al. | |
| 6,278,568 B1 | * | 8/2001 | Cloke .............. | G11B 20/10037 360/46 |
| 6,351,427 B1 | | 2/2002 | Brown | |
| 6,606,216 B1 | | 8/2003 | Liikanen et al. | |

(Continued)

OTHER PUBLICATIONS

Analog Devices, Application Note AN-877, Interfacing to High Speed ADCs via SPI, by the High Speed Converter Division, 2005-2007, 20 pages.

(Continued)

*Primary Examiner* — Ali Neyzari

(57) ABSTRACT

A method is provided to enable communication between a controller and a preamplifier in a storage device. For example, the method includes implementing a serial port which is configured to transmit digital signals between the controller and the preamplifier over a single bidirectional serial data line. The serial port is controlled to selectively transmit digital signals over the bidirectional serial data line in either a first direction from the controller to the preamplifier or a second direction from the preamplifier to the controller.

15 Claims, 9 Drawing Sheets

(56) References Cited

U.S. PATENT DOCUMENTS

| | | |
|---|---|---|
| 7,957,370 B2 | 6/2011 | Behrens et al. |
| 8,055,857 B2 | 11/2011 | Brox et al. |
| 8,289,821 B1 | 10/2012 | Huber |
| 8,351,281 B2 | 1/2013 | Perego et al. |
| 8,417,873 B1 | 4/2013 | Karamcheti et al. |
| 8,711,502 B1 * | 4/2014 | Wilson .................. G11B 5/09 360/46 |
| 8,817,402 B2 * | 8/2014 | Wilson ............. G11B 20/10222 360/46 |
| 8,929,013 B1 | 1/2015 | Mastrocola et al. |
| 8,966,151 B2 * | 2/2015 | Zitlaw ...................... G06F 1/10 710/305 |
| 2012/0275279 A1 | 11/2012 | Wilson et al. |
| 2013/0128375 A1 | 5/2013 | Livshitz et al. |
| 2013/0262907 A1 | 10/2013 | Zitlaw |
| 2013/0329482 A1 | 12/2013 | Gillingham et al. |
| 2014/0104716 A1 | 4/2014 | Wilson et al. |

OTHER PUBLICATIONS

AN10216-01 I2C Manual, Philips Semiconductors, Mar. 24, 2003, 51 pages.

J. Kim et al., "Multi-Gigabit-Rate Clock and Data Recovery Based on Blind Oversampling," IEEE Communications Magazine, vol. 41, Issue 12, Dec. 2003, pp. 68-74.

U.S. Appl. No. 14/267,354, filed May 1, 2014, entitled "Multiplexed Communication in a Storage Device."

U.S. Appl. No. 13/719,615, filed Dec. 19, 2012, entitled "Tag Multiplication Via a Preamplifier Interface."

U.S. Appl. No. 13/650,474, filed Oct. 12, 2012, entitled "Preamplifier-To-Channel Communication in a Storage Device."

* cited by examiner

SERIAL PORT COMMUNICATION FOR STORAGE DEVICE USING SINGLE BIDIRECTIONAL SERIAL DATA LINE

FIELD OF THE INVENTION

The field generally relates to data storage devices and, in particular, to communication between components of a data storage device.

BACKGROUND

Data storage devices such as hard disk drives are utilized for non-volatile data storage in a wide variety of data processing systems. In a magnetic disk storage device, a storage disk comprises a substrate made from a non-magnetic material, such as aluminum or glass, which is coated with one or more thin layers of magnetic material. In operation, data is read from, and written to, tracks of a magnetic storage disk using a magnetic head that includes a read sensor and write element. In general, a storage device includes a preamplifier that is configured to drive a read sensor in the magnetic head to read data from a magnetic storage disk and amplify the read data, as well as drive a write element in the magnetic head to write data to the storage disk. Moreover, a storage device includes a recording channel that is configured to decode read data that is received from the preamplifier, and encode write data that is to be written to the storage disk. Communication between the preamplifier and the recording channel is implemented using an analog bus and a digital bus, for example. A conventional analog bus comprises a plurality of analog signal lines, which enable high-speed transmission of analog read and write data signals between the recording channel and the preamplifier. Each analog signal line is a dedicated line that transmits either read data or write data. Further, a conventional digital bus implements a three wire serial port comprising a clock signal line, a data line, and an enable line, which serves to transmit digital control signals for setup and status monitoring of configuration registers located within the preamplifier. Other digital control functions that require dedicated digital control lines and which cannot tolerate the polling and latency characteristic of the serial port are transmitted on a bit-significant basis on additional dedicated control bus lines. These conventional communication schemes are inefficient in terms of the number of signal lines that are required to transmit data and control signals between the recording channel, preamplifier, and a controller.

SUMMARY

In an embodiment of the invention, a method is provided to enable communication between a controller and a preamplifier in a storage device. For example, the method includes implementing a serial port that is configured to transmit digital signals between the controller and the preamplifier over a single bidirectional serial data line. The serial port is controlled to selectively transmit digital signals over the bidirectional serial data line in either a first direction from the controller to the preamplifier or a second direction from the preamplifier to the controller.

Other embodiments include, without limitation, circuits, systems, integrated circuit devices, storage devices, storage systems, and computer-readable media.

WRITTEN DESCRIPTION

Figure 1:
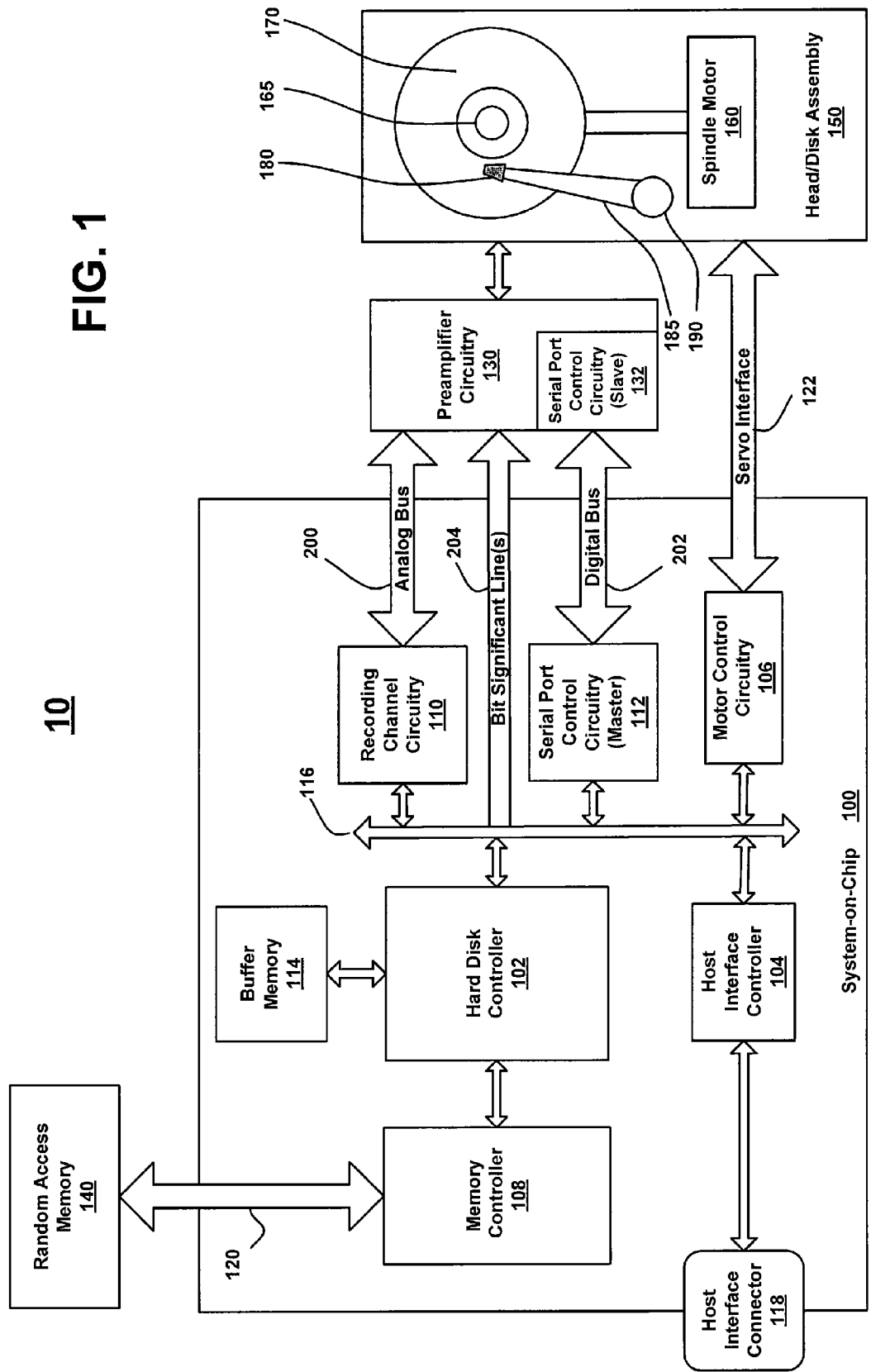
FIG. 1 schematically illustrates a storage device according to an embodiment of the invention.

FIG. 1 schematically illustrates a storage device 10 according to an embodiment of the invention. The storage device 10 comprises a system-on-chip 100 that includes various integrated circuits such as a hard disk controller 102, a host interface controller 104, a motor control circuitry 106, a memory controller 108, recording channel circuitry 110, master serial port control circuitry 112, and buffer memory 114. An internal bus 116 enables communication between the hard disk controller 102, the host interface controller 104, motor control circuitry 106, the recording channel circuitry 110, and the master serial port control circuitry 112. The system-on-chip 100 further comprises a plurality of interfaces such as a host interface connector 118, a memory interface 120, and a servo interface 122. The storage device 10 further comprises preamplifier circuitry 130, a random access memory 140, and a read/write head and disk assembly 150. The preamplifier circuitry 130 includes slave serial port control circuitry 132. The master and slave serial port control circuitries 112 and 132 are collectively referred to herein as master/slave serial port control circuitry 112/132 or serial port control circuitry 112/132.

The storage device 10 further comprises an analog bus 200, a digital bus 202, and bit significant lines 204. In one embodiment of the invention, the analog bus 200, digital bus 202, and bit significant lines 204 are implemented using a flexible cable or flex-cable comprising a plurality of signal lines to connect the preamplifier circuitry 130 to circuitry on the system-on-chip 100. In one embodiment of the invention, each signal line of the analog bus 200, digital bus 202, and bit significant lines 204 is a differential transmission line to support differential signaling using differential driver circuitry. In other embodiments of the invention, the signal lines can be implemented using other common types of transmission lines, such as single-ended transmission lines, which are suitable for the given application.

The analog bus 200 enables communication between the recording channel circuitry 110 and the preamplifier circuitry 130. In one embodiment of the invention, the analog bus 200 comprises a plurality of unidirectional signal lines to transmit read and write information signals between the recording channel circuitry 110 and the preamplifier circuitry 130. In another embodiment, the analog bus 200 comprises one or more signal lines that are controlled by multiplexing circuitry, wherein the multiplexing circuitry controls bidirectional transmission of read and write information signals between the recording channel circuitry 110 and the preamplifier circuitry 130 over one or more signal lines of the analog bus 200.

The digital bus 202 is controlled by the serial port control circuitry 112/132. The digital bus 202 and serial port control circuitry 112/132 collectively implement a serial port that is configured to transmit digital signals between the hard disk controller 102 and the preamplifier circuitry 130 over a single bidirectional serial data line of the digital bus 202. The serial port control circuitry 112/132 operates in a master/slave manner to enable communication between the hard disk controller 102 and the preamplifier circuitry 130, as discussed in further detail below. While hard disk controller 102 and the master serial port control circuitry 112 are shown in FIG. 1 as separate blocks, in another embodiment of the invention, the master serial port control circuitry 112 is a circuit component of the hard disk controller 102.

The bit significant lines 204 are dedicated signal lines that allow the hard disk controller 102 to transmit digital control signals (on a bit-significant basis) to the preamplifier circuitry 130 to control functions that require dedicated digital control lines and which cannot tolerate the polling and latency characteristic of the serial port. For example, Write Gate, Mode, and Fault control signals are control signals that can be transmitted on dedicated lines of the bit significant lines 204.

In general, the preamplifier circuitry 130 is implemented using a process technology that is optimized for transmission and/or processing of analog signals. For example, in one embodiment, the preamplifier circuitry 130 is implemented using a mixed bipolar and CMOS processing technology. The master serial port control circuitry 112 is implemented using a process technology that is optimized for transmission and/or processing of digital signals. For example, in one embodiment of the invention, the master serial port control circuitry 112 is implemented using a CMOS processing technology.

The read/write head and disk assembly 150 comprises various components such as a spindle motor 160, a spindle 165, a storage medium 170, a magnetic read/write head 180 (or simply, "magnetic head") disposed on one end of a positioning arm 185, and an actuator motor 190 (or voice coil motor) connected to one end of the positioning arm 185 opposite the magnetic head 180. The storage medium 170 has a storage surface coated with one or more magnetic materials that are capable of storing data bits in the form of respective groups of media grains oriented in a common magnetization direction (e.g., up or down). The storage medium 170 is mounted on the spindle 165, and the spindle 165 is driven by the spindle motor 160 to spin the storage medium 170 at high speed. Data is read from and written to the storage medium 170 via the magnetic head 180 mounted on the positioning arm 185. The actuator motor 190 comprises a permanent magnet and a moving coil motor, which operate to controllably swing the magnetic head 180 into a desired position across the magnetic surface of the storage medium 170 as the storage medium 170 spins by operation of the spindle motor 160.

In general, a sequence of magnetic flux transitions corresponding to a digital data sequence are written onto the magnetic surface of the storage medium 170 using the magnetic head 180. The digital data sequence serves to modulate current in the write coil of the magnetic head 180. The magnetic surface of storage medium 170 comprises a plurality of concentric tracks, wherein each track is subdivided into a plurality of sectors that are capable of storing a block of sector data for subsequent retrieval. Moreover, the storage medium 170 further comprises timing patterns formed on the surface thereof, which comprise one or more sets of servo address marks (SAMs) or other types of servo marks formed in particular sectors, wherein the servo marks are used to sense the position of the magnetic head 180 relative to a written track on the storage medium 170.

The host interface connector 118 represents a physical connector and associated input/output (I/O) bus wiring that connects the storage device 10 to a host system, device, I/O bus, or other components of a data processing system. The I/O data is moved to and from the storage device 10 through the host interface connector 118 under control of the host interface controller 104. The host interface controller 104 implements communication protocols for communicating with a host system or device and controlling and managing data I/O operations, using one or more known interface standards. For example, in one or more alternative embodiments of the invention, the host interface connector 118 and the host interface controller 104 are implemented using one or more of Small Computer interface (SCSI), Serial Attached SCSI (SAS), Serial Advanced Technology Attachment (SATA) and/or Fibre Channel (FC) interface standards, for example.

The hard disk controller 102 controls the overall operations of writing and reading data to and from the storage medium 170. Furthermore, in one embodiment of the invention, the hard disk controller 102 comprises a programmable microprocessor or microcontroller, which controls ECC (error correction code) operations, as well as data flow over the internal buss 116, and buffering operations to store read/write data in the buffer memory 114 via a DMA (direct memory access) protocol, for example. In other embodiments, the hard disk controller 102 may be implemented using other known architectures that are suitable for controlling hard disk operation and ECC/data flow operations. The recording channel circuitry 110 encodes and decodes data that is written to and read from the storage medium 170 using the magnetic head 180. The recording channel circuitry 110 comprises various types of circuitry that are commonly implemented in a recording channel to process data that is read from and written to the storage medium 170, the details of which are not necessary to one of ordinary skill in the art for understanding embodiments of the invention as discussed herein.

The preamplifier circuitry 130 is connected between the recording channel circuitry 110 and the magnetic head 180. In one embodiment, the preamplifier circuitry 130 is disposed proximate to a pivot location of the actuator motor 190. Flexible printed-circuit cables are used to connect the magnetic head 180 to the preamplifier circuitry 130. The preamplifier circuitry 130 amplifies an analog signal output from the magnetic head 180 for input to the recording channel circuitry 110 and provides a bias voltage for driving the read sensors of the magnetic head 180.

The motor control circuitry 106 is connected to the head/disk assembly 150 via the servo interface 122. It is to be understood that the servo interface 122 includes various components such as signals lines to transmit motor control signals, and power driver circuitry to drive the spindle motor 160 and actuator motor 190. Typically, the power driver circuitry is implemented on a dedicated integrated circuit chip connected between the system-on-chip 100 and the head/disk assembly 150. In general, the motor control circuitry 106 generates control signals to control the spindle motor 160 and actuator motor 190 during read and write operations to spin the storage medium 170 and move the magnetic head 180 into a target position.

In particular, for a typical read operation, read command signals for performing a read operation are received through the host interface connector 118 and sent to the hard disk controller 102 through the host interface controller 104 over the internal bus 116. The hard disk controller 102 processes the read command signals for performing the read operation and then sends control signals to the motor control circuitry 106 for controlling the actuator motor 190 and spindle motor 160 for the read operation. Additionally, the hard disk controller 102 sends the processed read signals to the recording channel circuitry 110, which are then sent to the actuator motor 190 through the preamplifier circuitry 130 to perform the read operation. The actuator motor 190 positions the magnetic head 180 over a target data track on storage medium 170 in response to control signals generated by the motor control circuitry 106 and the recording channel circuitry 110. The motor control circuitry 106 also generates control signals to drive the spindle motor 160 to spin the storage medium 170 under the direction of the hard disk controller 102. The spindle motor 160 spins the storage medium 170 at a determined spin rate. In one embodiment of the invention, the motor control circuitry 106 is a circuit component of the hard disk controller 102.

When the magnetic head 180 is positioned adjacent a target data track, magnetic signals representing data on the storage medium 170 are sensed by magnetic head 180 as the storage medium 170 is rotated by the spindle motor 160. The sensed magnetic signals are provided as continuous, minute analog signals (read back signals) representative of the magnetic data on the storage medium 170. The analog read back signals are transferred from the magnetic head 180 to the recording channel circuitry 110 via the preamplifier circuitry 130. The preamplifier circuitry 130 amplifies the analog read back signals accessed from storage medium 170, and the recording channel circuitry 110 decodes and digitizes the amplified analog read back signals to recreate the information originally written to the storage medium 170. The data read from the storage medium 170 is then output to a host system or device through the host interface controller 104 and host interface connector 118 under control of the hard disk controller 102.

A write operation is substantially the opposite of a read operation. For example, in one embodiment, write data and command signals for performing write operations are received through the host interface connector 118, wherein the write signals represent commands to perform a write operation and/or data that is to be written to the storage medium 170. The write signals are sent to the hard disk controller 102 through host interface controller 104. The hard disk controller 102 processes the write signals for performing the write operation and then sends control signals to the motor control circuitry 106 for controlling the actuator motor 190 and spindle motor 160 for the write operation. Additionally, the hard disk controller 102 sends the processed write signals (and formatted data) to the recording channel circuitry 110, wherein the formatted data to be written is encoded. The write signals (control and data) are then sent to the head/disk assembly 150 via the preamplifier circuitry 130 to perform a write operation by writing data to the storage medium 170 via the magnetic head 180.

In the embodiment of FIG. 1, the random access memory 140, the buffer memory 114, the memory controller 108, and the memory bus 120 are configured to perform or otherwise support data caching and buffering functions that are typically implemented in data storage devices, as well as store and enable access to firmware sequences that control operation of the hard disk controller 102 and other components connected thereto. The random access memory 140 is an external memory relative to the system-on-chip 100 and other components of the storage device 10, but is nonetheless internal to the storage device 10. In one embodiment, the random access memory 140 is a double data rate synchronous dynamic random access memory, although a wide variety of other types of memory may be used in alternate embodiments.

It is to be understood that the random access memory 140, system-on-chip 100 and preamplifier circuitry 130 shown in FIG. 1 collectively represent one embodiment of "control circuitry" as that term is utilized herein. Numerous alternative embodiments of "control circuitry" include a subset of the components 100, 130 and 140 or portions of one or more of these components. For example, the system-on-chip 100 may be viewed as an example of "control circuitry" to process data received from and supplied to the magnetic head 180 and to control positioning of the magnetic head 180 relative to the storage medium 170. Certain operations of the system-on-chip 100 in the storage device 10 of FIG. 1 may be directed by the hard disk controller 102, which executes code stored in the random access memory 140 and/or the buffer memory 114, for example. Thus, at least a portion of the control functionality of the storage device 10 may be implemented at least in part in the form of software code.

Furthermore, although the embodiment of FIG. 1 illustrates various components of the system-on-chip 100 being implemented on a single integrated circuit chip, the system-on-chip 100 may include other integrated circuits, such as the random access memory 140 or the preamplifier circuitry 130, or portions thereof. Moreover, the hard disk controller 102, the host interface controller 104, the motor control circuitry 106, and the master serial port control circuitry 112 may be implemented using suitable integrated circuit architectures such as microprocessor, digital signal processor (DSP), application-specific integrated circuit (ASIC), or field-programmable gate array (FPGA), or other types of integrated circuit architectures.

While FIG. 1 shows an embodiment of the invention with a single instance of each of the storage medium 170, magnetic head 180, and positioning arm 185, it is to be understood that in an alternate embodiment of the invention, the storage device 10 comprises multiple instances of one or more of these or other drive components. For example, in an alternative embodiment of the invention, the storage device 10 comprises multiple storage disks attached to the same spindle such that each storage disk rotates at the same speed, as well as multiple magnetic read/write heads and associated positioning arms coupled to one or more actuators.

Moreover, it is to be understood that a read/write head as that term is broadly used herein may be implemented in the form of a combination of separate read and write heads. More particularly, the term "read/write" as used herein is intended to be construed broadly as read and/or write, such that a read/write head may comprise one or more read heads only, one or more write heads only, a single head used for both reading and writing, or a combination of separate read and write heads. Such heads may comprise, for example, write heads with wrap-around or side-shielded main poles, or any other types of heads suitable for recording and/or reading data on a storage disk.

In addition, the storage device 10 as illustrated in FIG. 1 may include other elements in addition to, or in place of, those specifically shown, including one or more elements of a type commonly found in conventional storage devices. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
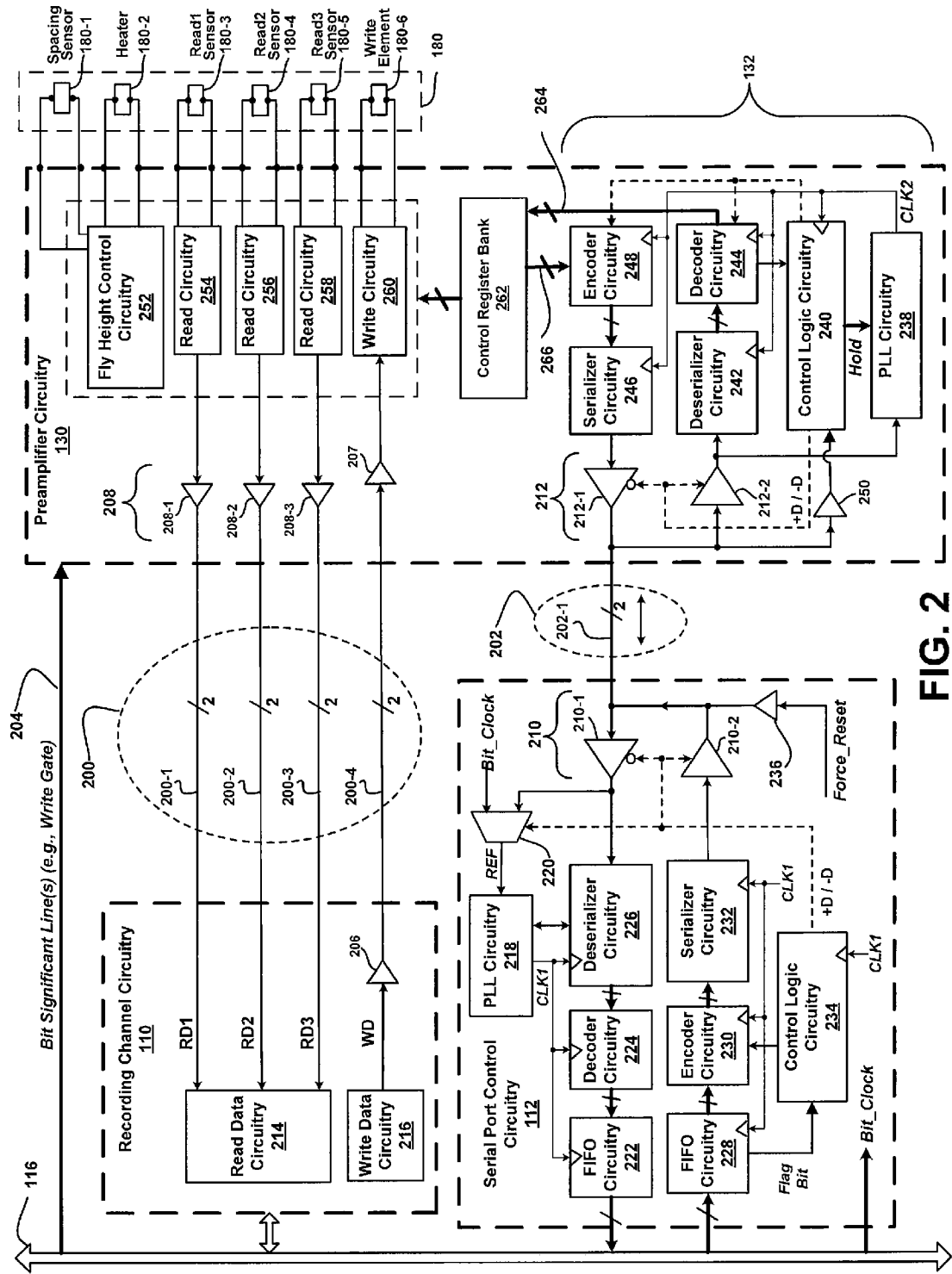
FIG. 2 is a schematic block diagram that illustrates a more detailed embodiment of the storage device of FIG. 1 having control circuitry to support serial port communication between a controller and a preamplifier using a single bidirectional serial data line, according to an embodiment of the invention.

FIG. 2 is a schematic block diagram that illustrates a more detailed embodiment of the storage device of FIG. 1 having control circuitry to support serial port communication between a controller and a preamplifier using a single bidirectional serial data line, according to an embodiment of the invention. More specifically, FIG. 2 illustrates embodiments of the recording channel circuitry 110, the master/slave serial port control circuitry 112/132, the preamplifier circuitry 130, the magnetic head 180, the analog bus 200, and the digital bus 202 in the storage device 10 of FIG. 1.

Referring to FIG. 2, the analog bus 200 comprises a plurality of signal lines 200-1, 200-2, 200-3, and 200-4, which enable transmission of signals over the analog bus 200 between the recording channel circuitry 110 and the preamplifier circuitry 130. In the embodiment shown in FIG. 2, the signal lines 200-1, 200-2, and 200-3 are "read" signal lines on which read data RD1, RD2, RD3 is transmitted over the analog bus 200 from the preamplifier circuitry 130 to the recording channel circuitry 110 during a read operation of the storage device 10. The signal line 200-4 is a "write" signal line on which write data WD is transmitted over the analog bus 200 from the recording channel circuitry 110 to the preamplifier circuitry 130. In the embodiment of FIG. 2, the signal lines 200-1, 200-2, 200-3, and 200-4 are implemented as differential transmission lines to assure noise immunity and signal quality of analog signals (or digital signals) that are transmitted over the analog bus 200 between the recording channel circuitry 110 and the preamplifier circuitry 130. In other embodiments, the signal lines 200-1, 200-2, and 200-3 can be implemented using other common types of signal transmission lines that are suitable for the given application.

The recording channel circuitry 110 and the preamplifier circuitry 130 comprise line drivers/receivers 206/207/208, which are line interface elements that enable the transmission of signals over the analog bus 200. For example, the recording channel circuitry 110 comprises a line driver 206 configured to drive write data signals over the signal line 200-4, and the preamplifier circuitry 130 comprises a line receiver 207 configured to receive write data signals transmitted over the signal line 200-4. In one embodiment of the invention, the line driver/receiver 206/207 are implemented using a CML (Current Mode Logic) circuit architecture to support differential transmission of write data WD signals over the signal line 200-4, as the write data WD signals are essentially digital in nature.

Further, the preamplifier circuitry 130 comprises line driver circuitry 208 comprising line drivers 208-1, 208-2 and 208-3 to drive respective signal lines 200-1, 200-2 and 200-3. In one embodiment of the invention, the line driver circuitry 208 is implemented using analog line drivers that are configured to drive read data RD signals over the respective signal lines 200-1, 200-2 and 200-3, which are essentially analog in nature. In one embodiment, the signal lines 200-1, 200-2 and 200-3 are each connected to VGA (variable gain amplifier) circuitry within analog "front end" processing circuitry of the recording channel circuitry 110.

Moreover, as shown in FIG. 2, the digital bus 202 consists of a single bidirectional serial data line 202-1 connecting the master serial port control circuitry 112 and the slave serial port control circuitry 132 of the preamplifier circuitry 130. In the embodiment of FIG. 2, the single bidirectional serial data line 202-1 is implemented as a differential transmission line so as to enable the transmission of high-rate bit streams that transmit digital signals (such as control data and commands) over the bidirectional serial data line 202-1. In other embodiments, the single bidirectional serial data line 202-1 can be implemented using other common types of signal transmission lines that are suitable for the given application.

The serial port control circuitry 112/132 comprises line multiplexing circuitry 210/212, which, as explained in further detail below, is configured to control bidirectional transmission of digital signals over the single bidirectional serial data line 202-1 in either an "outbound" direction or an "inbound" direction. It is to be understood that the term "outbound" as used herein generally refers to the direction of data flow processing and transmission of a serial bit stream data over the bidirectional serial data line 202-1 from the hard disk controller 102 to the preamplifier circuitry 130, while the term "inbound" as used herein generally refers to the direction of data flow processing and transmission of a serial bit stream data over the bidirectional serial data line 202-1 from the preamplifier circuitry 130 to the hard disk controller 102.

As further shown in FIG. 2, the recording channel circuitry 110 further comprises read data circuitry 214 and write data circuitry 216. The master serial port control circuitry 112 comprises PLL (phase-locked loop) circuitry 218, an "inbound" data processing path comprising FIFO (first-in-first-out) circuitry 222, decoder circuitry 224 and deserializer circuitry 226, and an "outbound" data processing path comprising FIFO circuitry 228, encoder circuitry 230 and serializer circuitry 232. The master serial port control circuitry 112 further comprises control logic circuitry 234, preamplifier reset control circuitry 236, and switching circuitry 220. The line multiplexing circuitry 210 comprises a line receiver 210-1 and a line driver 210-2, which are controlled (enabled/disabled) by a direction control signal (+D/−D) output from the control logic circuitry 234. In one embodiment, the line multiplexing circuitry 210 is implemented using CML, for example.

The slave serial port control circuitry 132 (of the preamplifier circuitry 130) comprises PLL circuitry 238, control logic circuitry 240, an "outbound" data processing path comprising deserializer circuitry 242 and decoder circuitry, an "inbound" data processing path comprising serializer circuitry 246 and encoder circuitry 248, and preamplifier reset control circuitry 250. The line multiplexing circuitry 212 comprises a line driver 212-1 and a line receiver 212-2, which are controlled (enabled/disabled) by a direction control signal (+D/−D) output from the control logic circuitry 240. In one embodiment, the line multiplexing circuitry 212 is implemented using CML, for example.

The preamplifier circuitry 130 further comprises fly height control circuitry 252, read circuitry 254, 256 and 258, write circuitry 260, and a control register bank 262. The magnetic head 180 comprises a spacing sensor 180-1, a heater element 180-2, a plurality of read sensors 180-3, 180-4 and 180-5, and a write element 180-6. The various components of the magnetic head 180 can be implemented using structures and techniques that are well known in the art and consequently, a detailed explanation of such components is not necessary for understanding embodiments of the invention.

In general, the read circuits 254, 256, and 258 and respective read sensors 180-3, 180-4, and 180-5 are configured to read and process magnetic signals that represent data stored on the storage medium 170. The read sensors 180-3, 180-4, and 180-5 are configured to sense magnetic signals that exist on the storage medium 170, and output the sensed magnetic signals as continuous, minute analog signals (read back signals) representative of the data that is stored on the storage medium 170. The read circuits 254, 256, and 258 include circuitry such as sensor bias sources to support the read sensors 180-3, 180-4 and 180-5, as well as low noise amplifiers to amplify the analog signals output from the read sensors 180-3, 180-4 and 180-5. The read circuits 254, 256, and 258 may include other circuitry that is commonly implemented to process read back signals.

FIG. 2 depicts an embodiment of a multi-dimensional recording system in which two or more read sensors are active during a read operation. Multi-dimensional recording techniques such as TDMR (Two Dimensional Magnetic Recording) have been developed to support higher bit densities in magnetic recording systems. With TDMR systems, two or more read heads are used to read the same track (and adjacent tracks) with a certain read offset, affording a degree of interference cancellation. TDMR enables the use of effective coding and signal processing algorithms that allow data bits to be stored at higher densities on a magnetic storage disk, and retrieved and decoded with acceptable error rates. In the example embodiment of FIG. 2, each of the three read sensors 180-3, 180-4, and 180-5 are active during a read operation, thereby outputting multiple read back signals RD1, RD2, and RD3, which are concurrently transmitted from the preamplifier circuitry 130 to the recording channel circuitry 110 over the analog bus 200.

In the recording channel circuitry 110, the read data circuitry 214 concurrently receives and processes the read back signals RD1, RD2, and RD3. The read data circuitry 214 comprises various types of circuitry for conditioning and digitizing the analog read back signals RD1, RD2, and RD3, and extracting a digital representation of the originally recorded data. For example, the read data circuitry 214 comprises analog front-end circuitry for analog signal processing the read back signals RD1, RD2, and RD3 received from the preamplifier circuitry 130 using well-known circuits and analog signal processing techniques. The read data circuitry 214 further comprises analog-to-digital converter circuitry that digitizes the analog signals, and other circuitry such as data equalization circuitry, data detection circuitry, data decoding circuitry, data deserialization circuitry, clock recovery circuitry, and other types of circuitry that is commonly included in recording channels for processing and decoding the digitized read back signals and recreating the digital data originally written to the storage medium, the details of which are not necessary for understanding embodiment of the invention described herein.

The write data circuitry 216 in the recording channel circuitry 110 is configured to receive write data (from the internal bus 116) that is to be written to the storage medium 170, and then deserialize, encode, write precompensate, and otherwise transform the write data into a form that can be recorded on the storage medium 170. The write data circuitry 216 outputs encoded write data WD for transmission to the preamplifier circuitry 130 over the analog bus 200. In the preamplifier circuitry 130, the write circuitry 260 receives the encoded write data WD and further processes the encoded write data WD, as desired, for recording on the storage medium 170. The write circuitry 260 is further configured to drive the write element 180-6 in the magnetic head 180 for recording the write data WD on the storage medium 170.

The fly height control circuitry 252 is configured to controllably adjust the spacing (or fly height) between the magnetic head 180 and the surface of the storage medium 170. In general, the fly height control circuitry 252, spacing sensor 180-1, and heater element 180-2 are configured to cooperate with elements of the recording channel circuitry 110 and firmware that is operative within the hard disk controller 102 to maintain a constant, low head-to-disk spacing that is needed for high-density recording, using known techniques.

In general, the serial port control circuitry 112/132 implements a master/slave control framework configured to selectively transmit digital signals over the bidirectional serial data line 202-1 in either an "outbound" direction toward the preamplifier circuitry 130 or an "inbound" direction from the preamplifier circuitry 130. The serial port control circuitry 112/132 and bidirectional serial data line 202-1 provide a high-speed bidirectional serial port framework which is utilized to perform preamplifier register setup and access operations as well as interrogation functions. In other embodiments, the high-speed bidirectional serial port framework can also be used to control functions traditionally performed by the dedicated bit-significant lines 204 and other dedicated serial port control lines to control register access and sequencing functions in the preamplifier circuitry 130.

For example, to transmit digital signals in an "outbound" direction over the bidirectional serial data line 202-1 to the preamplifier circuitry 130, the direction control signals +D/−D (output from the control logic circuitry 234/240) are set to logic "1", which enables the line driver 210-2 and the line receiver 212-2, and which disables the line receiver 210-1 and the line driver 212-1. As a result, the master serial port control circuitry 112 assumes control of the bidirectional serial data line 202-1 to transmit digital signals to the preamplifier circuitry 130. On the other hand, to transmit digital signals in an "inbound" direction from the preamplifier circuitry 130, the direction control signals +D/−D are set to logic "0", which disables the line driver 210-2 and the line receiver 212-2, and which enables the line driver 212-1 and the line receiver 210-1. As a result, the slave serial port control circuitry 132 assumes control of the bidirectional serial data line 202-1 to transmit digital signals from the preamplifier circuitry 130.

In the master serial port control circuitry 112, the PLL circuitry 218 is configured to generate a clock signal CLK1 to control operation of the various circuit components 222, 224, 226, 228, 230, 232 and 234 of the master serial port control circuitry 112. The clock signal CLK1 is generated based on a reference clock signal REF that is applied to a reference input port of the PLL circuitry 218 from the output of the switching circuitry 220. In particular, the reference clock signal REF is one of a plurality of different reference signals that are applied at the inputs of the switching circuitry 220 and selectively output from the switching circuitry 220 depending on whether the serial port control circuitry 112/132 is transmitting a serial data stream over the bidirectional serial data line 202-1 in an "outbound" direction to the preamplifier circuitry 130 or in an "inbound" direction from the preamplifier circuitry 130.

For example, in the embodiment of FIG. 2, the switching circuitry 220 comprises a first input port configured to receive a bit rate clock signal Bit_Clock that is transmitted to the master serial port control circuitry 112 over the internal bus 116. In one embodiment, the bit rate clock signal Bit_Clock is a clock signal generated by a master PLL circuit in the hard disk controller 102 (FIG. 1) and transmitted to the master serial port control circuitry 112 over the internal bus 116. The bit rate clock signal Bit_Clock can be fixed or programmable, and generated using one of various techniques known to those of ordinary skill in the art. In addition, the switching circuitry 220 comprises a second input port configured to receive a serial bit stream that is transmitted over the bidirectional serial data line 202-1 in an "inbound" direction from the preamplifier circuitry 130.

As explained in further detail below, the switching circuitry 220 is controlled by the control logic circuitry 234 to selectively output the bit rate clock signal Bit_Clock to the PLL circuitry 218 as the reference clock signal REF when the master/slave serial port control circuitry 112/132 is transmitting digital signals in an "outbound" direction over the bidirectional serial data line 202-1 to the preamplifier circuitry 130. During an "outbound" transmission, the PLL circuitry 218 generates a clock signal CLK1 having a phase/frequency that is locked to the phase/frequency of the port bit rate clock signal Bit_Clock, wherein the clock signal CLK1 is used to control functions for encoding and transmitting digital signals over the bidirectional serial data line 202-1 to the preamplifier circuitry 130. In this regard, the frequency of the "outbound" data processing/transmission is precisely established by the port bit rate clock signal Bit_Clock.

On the other hand, when the serial port control circuitry 112/132 is transmitting digital signals in an "inbound" direction over the bidirectional serial data line 202-1 from the preamplifier circuitry 130, the switching circuitry 220 is controlled by the control logic circuitry 234 to selectively output a serial bit stream, which is received from the preamplifier circuitry 130 on the bidirectional serial data line 202-1, as the reference clock signal REF that is input to the PLL circuitry 218. During an "inbound" transmission, the PLL circuitry 218 generates a clock signal CLK1 having a phase/frequency that is locked to the phase/frequency of the serial data stream transmitted from the preamplifier circuitry 130, wherein the clock signal CLK1 is used to receive and decode the serial bit stream received from the preamplifier circuitry 130.

In the "outbound" data processing path of the master serial port control circuitry 112, the FIFO circuitry 228 is configured to receive and temporarily store digital information signals (e.g., bytes of register data, control characters, etc.) received over the internal bus 116 from, e.g., the hard disk controller 102 (FIG. 1). In one embodiment of the invention, the FIFO circuitry 228 is a 9-bit by n-character FIFO buffer, wherein each character (byte) is 8-bits and wherein a 9$^{th}$ bit (most significant bit) is used as a Flag Bit. As explained in further detail below with reference to FIG. 4, for example, the Flag Bit is used as an indicator (e.g., set to logic "1") to the control logic circuitry 234 that an "inbound" transfer is requested by the hard disk controller 102, for example, and the assertion of a Flag Bit initiates a sequence of operations (e.g., generation of a "direction switch" control character) to allow the preamplifier circuitry 130 to assume control of the bidirectional serial data line 202-1 and transmit information to the hard disk controller 102 as requested.

In addition, in the "outbound" data processing path of the master serial port control circuitry 112, the encoder circuitry 230 is configured to access and encode digital information signals stored in the FIFO circuitry 228. The serializer circuitry 232 is configured to serialize the encoded digital information signals into serial bit streams (of control and/or data characters) for transmission to the preamplifier circuitry 130 over the bidirectional serial data line 202-1.

Furthermore, in the "outbound" data processing path of the slave serial port control circuitry 132, the deserializer circuitry 242 is configured to deserialize a serial bit stream received on the bidirectional serial data line 202-1, and the decoder circuitry 244 is configured to decode a deserialized bit stream output from the deserializer circuitry 242. The decoded data output from the decoder circuitry 244 is transmitted to the control register bank 262 over a parallel data bus 264, and written to one or more target registers in the control register bank 262, for example.

In the "inbound" data processing path of the slave serial port control circuitry 132, the encoder circuitry 248 is configured to encode a digital information signal. The digital information signal may be, for example, one or more bytes of register data that is read from one or more registers of the control register bank 262 over a parallel data bus 266. The serializer circuitry 246 is configured to serialize an encoded digital signal (output from the encoder circuitry 248) into a serial bit stream for transmission over the bidirectional serial data line 202-1.

Moreover, in the "inbound" data processing path of the master slave serial port control circuitry 112, the deserializer circuitry 226 is configured to deserialize a serial bit stream received from the preamplifier circuitry 130 over the bidirectional serial data line 202-1. The decoder circuitry 224 is configured to decode a deserialized bit stream into data bytes, which are temporarily stored in the FIFO circuitry 222, for subsequent access by the hard disk controller 102, for example. The PLL circuitry 218 and the deserializer circuitry 226 operate in conjunction with one another to convert a serial bit stream into parallel data using suitable CDR (clock-data-recovery) techniques.

In the slave serial port control circuitry 132, the PLL circuitry 238 is configured to generate a clock signal CLK2 to control operation of the various circuit components 240, 242, 244, 246, and 248 of the slave serial port control circuitry 132. When the serial port control circuitry 112/132 is configured to transmit a serial bit stream over the bidirectional serial data line 202-1 in an "outbound" direction to the preamplifier circuitry 130, the PLL circuitry 238 receives as input, an "outbound" serial bit stream transmitted on the bidirectional serial data line 202-1 and performs phase/frequency corrections to generate a clock signal CLK2 having a phase/frequency that is "locked" to the phase/frequency of the received serial bit stream. During the "outbound" transmission, the clock signal CLK2 is used by the deserializer circuitry 242 and decoder circuitry 244 to receive and decode the digital signals transmitted over the bidirectional serial data line 202-1 to the preamplifier circuitry 130.

On the other hand, when the serial port control circuitry 112/132 is configured to transmit digital signals over the bidirectional serial data line 202-1 in an "inbound" direction from the preamplifier circuitry 130, the control logic circuitry 240 generates a control signal Hold which causes the PLL circuitry 238 to suspend phase and frequency adjustments and maintain the output clock CLK2 as a "static" clock signal (i.e., the clock signal CLK2 is maintained at the same phase/frequency of the clock signal CLK2 that existed at the time that the control signal Hold was asserted). In other words, when the control signal Hold is asserted, phase/frequency corrections of the PLL circuitry 238 are suspended, thereby allowing a voltage-controlled oscillator (VCO) of the PLL circuitry 238 to "freewheel" at a nominal baud rate of a previously received "outbound" serial bit stream. In this regard, when transmitting digital signals in an "inbound" direction, the clock signal CLK2 is maintained at a constant phase/frequency and is used by the encoder circuitry 248 and serializer circuitry 246 to encode, serialize and transmit the digital signals over the bidirectional serial data line 202-1 from the preamplifier circuitry 130.

In one embodiment of the invention, the PLL circuitry 238 is implemented using an analog PLL framework, which will be discussed in further detail below with reference to FIG. 5. An analog embodiment of the PLL circuitry 238 can be used (instead of a digital embodiment) in recognition of the limited digital capability in many analog-centric BiCMOS processes that are typically used in the fabrication of preamplifiers for data storage devices. However, in other embodiments of the invention, the PLL circuitry 238 can be implemented using a digital PLL framework.

In one embodiment of the invention, the encoder circuitry 230 and 248 and decoder circuitry 224 and 244 of the master/slave serial port control circuitry 112/132 perform encoding and decoding functions using an 8B/10B coding protocol. As is known in the art, an 8B/10B coding protocol is a serial bit stream transmission protocol in which an eight-bit data byte is converted to a 10-bit transmission character. In particular, in 8B/10B coding, a data byte (8-bit data) is encoded using one of 256 out of 1024 possible 10-bit code characters obeying d,k=0,4 constraints. The k=4 constraint of the 8B/10B code assures that a clock can be extracted from an encoded data stream. The dc spectral null property of the 8B/10B code may or may not be implemented in embodiments of the invention. Control and framing characters are selected from the remaining 10-bit symbols. For example, a "direction switch" control signal that is generated in response to an asserted Flag Bit can be a predefined 8B/10B control character. On the "outbound" transmission, the 8B/10B coding essentially provides an embedded clock, wherein every 10 bits in the serial bit stream represents one 8B/10B data or control character.

Figure 3:
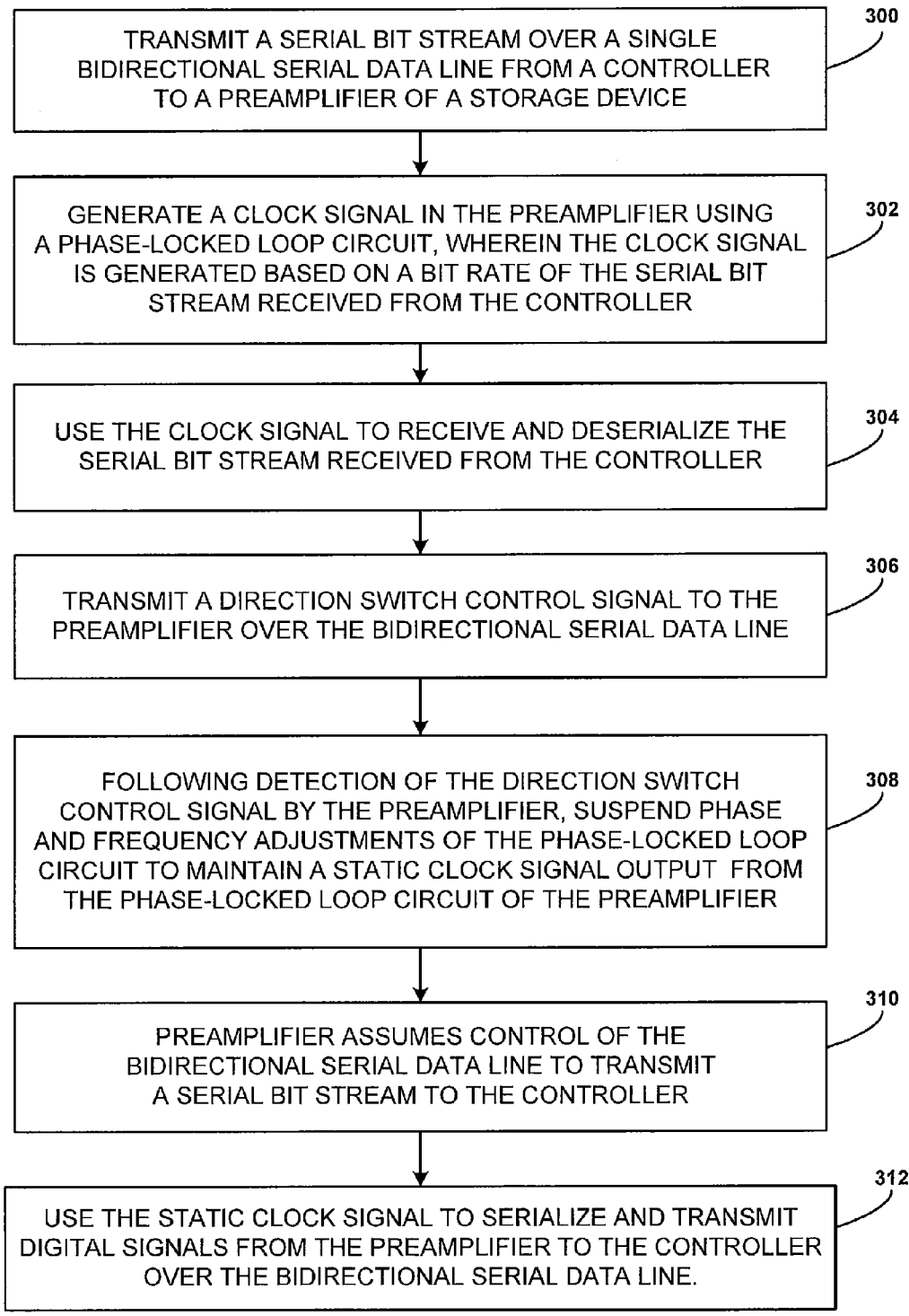
FIG. 3 is a flow diagram of a method to implement serial port communication between a controller and a preamplifier using a single bidirectional serial data line, according to an embodiment of the invention.

FIG. 3 is a flow diagram of a method to implement serial port communication between a controller and a preamplifier using a single bidirectional serial data line, according to an embodiment of the invention. More specifically, FIG. 3 illustrates a method for controlling a serial port to selectively transmit digital signals between a controller and a preamplifier over a bidirectional serial data line, according to an embodiment of the invention. In general, a method for controlling the serial port includes transmitting a serial bit stream over the bidirectional serial data line from the controller to the preamplifier (block 300), generating a clock signal in the preamplifier using a phase-locked loop circuit, wherein the clock signal is generated based on a bit rate of the serial bit stream transmitted over the bidirectional serial data line from the controller (block 302), and using the clock signal in the preamplifier to receive and deserialize the serial bit transmitted over the bidirectional serial data line from the controller (block 304).

In the context of the illustrative embodiments of FIGS. 1 and 2 as discussed above, the process flow of blocks 300, 302 and 304 corresponds to a mode of operation of the master/slave serial port control circuitry 112/132 in which digital information signals (e.g., register address information and register data) are transmitted in an "outbound" direction to the preamplifier circuitry 130. On the other hand, the process flow of blocks 306, 308, 310 and 312 (as discussed below) correspond to a mode of operation of the master/slave serial port control circuitry 112/132 in which a serial port "direction switch" is effected to transmit digital information signals (e.g., register data) in an "inbound" direction from the preamplifier circuitry 130 to the hard disk controller 102, for example.

More specifically, referring to FIG. 3, a method of controlling the serial port further comprises transmitting a direction switch control signal over the bidirectional serial data line to the preamplifier (block 306). Following detection of the direction switch control signal by the preamplifier, the preamplifier generates a control signal (referred to herein as Hold signal) to suspend phase and frequency adjustments of the phase-locked loop circuit of the preamplifier and maintain a static clock signal output from the phase-locked loop circuit of the preamplifier (block 308). The preamplifier then assumes control of the bidirectional serial data line to transmit digital signals from the preamplifier to the controller (block 310). The static clock signal is used to serialize and transmit data from the preamplifier to the controller over the bidirectional serial data line (block 312).

Figure 4:
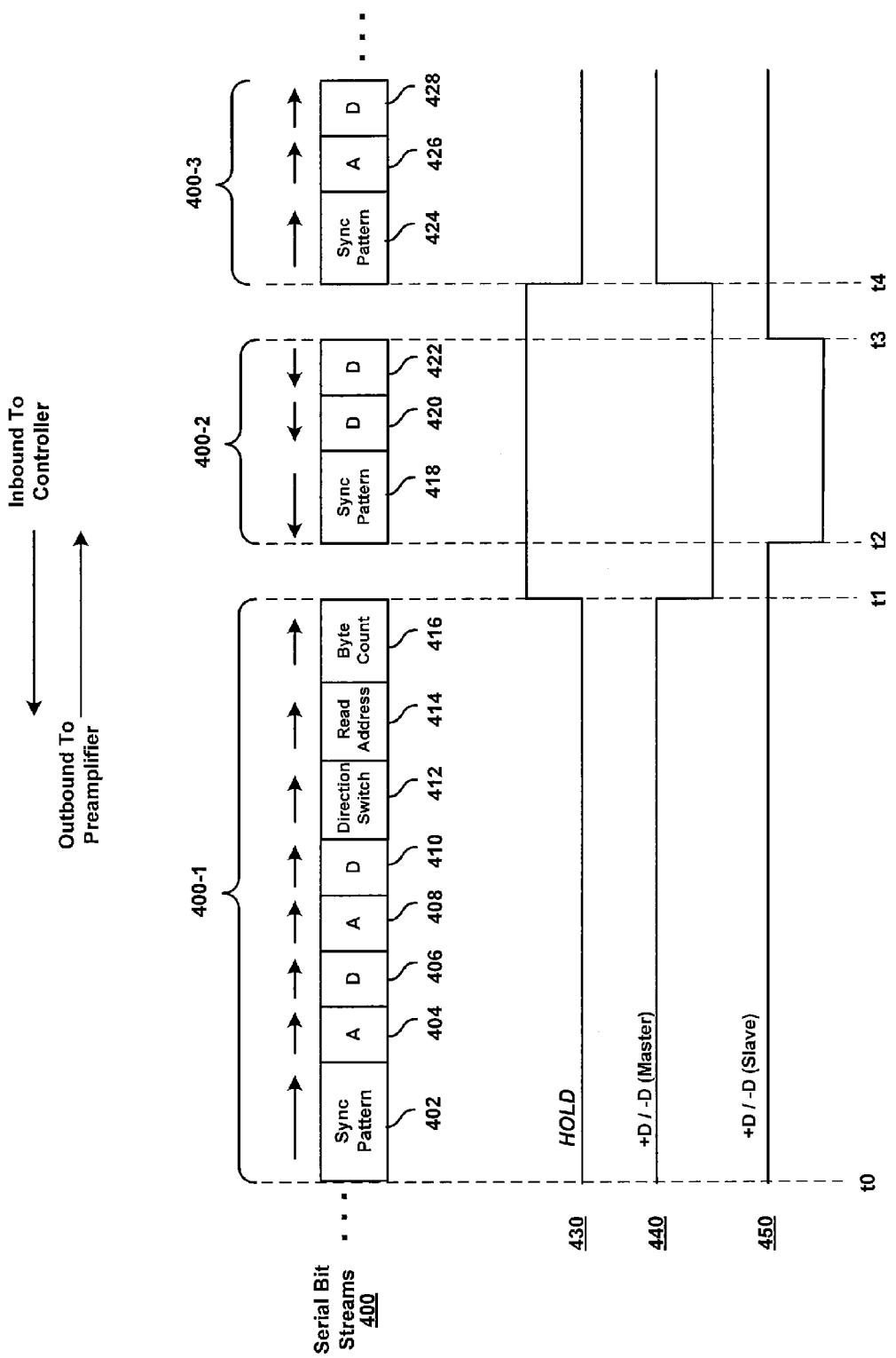
FIG. 4 is a timing diagram that schematically illustrates a method for controlling a serial port to selectively transmit digital signals between a controller and a preamplifier using a single bidirectional serial data line, according to an embodiment of the invention.

For purposes of illustration, a more detailed embodiment of the method of FIG. 3 will be discussed in further detail below with reference to timing diagrams shown in FIG. 4, wherein FIG. 4 schematically illustrates a method for controlling a serial port to selectively transmit digital signals between a controller and a preamplifier using a single bidirectional serial data line, according to an embodiment of the invention. Moreover, the embodiments of FIGS. 3 and 4 will be discussed with further reference to FIGS. 1 and 2 in the context of operating modes of the master/slave serial port control circuitry 112/132 to control bidirectional transfer of digital signals over the bidirectional serial data line 202-1.

In general, FIG. 4 illustrates examples of serial bit streams 400 that are transmitted over the bidirectional serial data line 202-1 in "outbound" and "inbound" directions (as indicated by the arrows). In particular, FIG. 4 illustrates an "outbound" serial bit stream 400-1 comprising blocks 402, 404, 406, 408, 410, 412, 414, and 416, an "inbound" serial bit stream 400-2 comprising blocks 418, 420 and 422, and an "outbound" bit stream 400-3 comprising blocks 424, 426 and 428. In addition, FIG. 4 illustrates example waveforms of control signals to control the transmission of the serial bit streams 400-1, 400-2 and 400-3 over the bidirectional serial data line 202-1 including, for example, a HOLD control signal 430 which is generated by the control logic circuitry 240 in the slave serial port control circuitry 132, a direction control signal 440 (+D/−D) which is generated by the control logic circuitry 234 in the master serial port control circuitry 112, and a direction control signal 450 (+D/−D) which is generated by the control logic circuitry 230 in the slave serial port control circuitry 132.

More specifically, in the example embodiment of FIG. 4, the "outbound" serial bit stream 400-1 includes a synchronization bit pattern 402, register write address/data pairs 404/406 and 408/410, a direction switch control character 412, register read address information 414, and associated byte count information 416. In general, the synchronization pattern 402 comprises a bit pattern that is transmitted to the preamplifier circuitry 130 and used in the slave serial port control circuitry 132 to effect an unambiguous phase/frequency "pull-in" of the PLL circuitry 238 in the preamplifier circuitry 130, using techniques well known to those of ordinary skill in the art. This phase/frequency "pull-in" is needed, as there is no precision reference clock in the preamplifier circuitry 130, and the output clock CLK2 of the PLL circuitry 238 needs to be "phased-locked" to the outbound serial bit stream 400-1 to be transmitted to the preamplifier circuitry 130. Depending on the implementation, the synchronization pattern 402 may include a "constant-frequency preamble"

and an 8B/10B "frame" character, to enable synchronization of the PLL circuitry 238 and to denote an end of the preamble and a beginning of a bit stream of data.

As further shown in FIG. 4, during a time period from t0 to t1 in which the "outbound" serial bit stream 400-1 is transmitted to the preamplifier circuitry 130, the HOLD control signal 430 (which is output from the control logic circuitry 240) is held at a logic "0" level (de-asserted), enabling the PLL circuitry 238 to make phase/frequency corrections and maintain the clock signal CLK2 phase-locked to the serial bit stream 400-1. Furthermore, the direction control signals 440 and 450 (which are generated by the respective control logic circuitries 234 and 240 in the master/slave serial port control circuitry 112/132) are held at a logic "1" level. In this state, the line driver 210-2 and the line receiver 212-2 are activated to support the "outbound" transmission, while the line driver 212-1 and the line receiver 210-1 are deactivated (see FIG. 2).

In the example embodiment of FIG. 4, the "outbound" serial bit stream 400-1 includes register address information 404 and 408 which specifies the address of registers to which register data is to be written in the control register bank 262 of the preamplifier circuitry 130, and the register data 406 and 410 includes the actual register data that is to be written into the registers at the respective register addresses 404 and 408. As discussed above with reference to FIG. 2, in one embodiment of the invention, the hard disk controller 102 writes 8-bit information (bytes) into the 9-bit-wide FIFO circuitry 228, wherein the first 8 bits represent register data/address information, for example, and the $9^{th}$ bit is a Flag Bit which is asserted (logic 1) to specify a direction switch on the serial port.

As further discussed above with reference to FIG. 2, the encoder circuitry 230 encodes each 8-bit output (byte) into a 10-bit character using e.g., the well-known 8B/10B coding protocol. The 10-bit encoded characters (represented by blocks 404, 406, 408, and 410, for example) are serialized via the serializer circuitry 232 and transmitted to the preamplifier circuitry 130 over the bidirectional serial data line 202-1. Within the preamplifier circuitry 130, the serialized data stream is input to the deserializer circuitry 242 and the PLL circuitry 238, which provides the deserializing bit-rate clock CLK2. Each 10-bit character is decoded by the decoder circuitry 244 which outputs corresponding bytes (8-bits) representing register address information and register data, which is used to store preamplifier configuration and control information in registers of the control register bank 262.

Although FIG. 4 illustrates an address/register data pair format to write to registers in the control register bank 262, other formats can be implemented. For example, a register write format comprising start-address/byte-count-N/byte 1/byte 2/.../byte N, can be utilized. In this embodiment, the start-address denotes an address of a first register to be written, and the byte-count-N specifies N sequential register addresses to which data is to be written, wherein N includes a sequence of N consecutive registers including and following the first register address. The register data byte 1/byte 2/.../byte N represents the actual data bytes that are to be written to the specified N sequential register addresses. For instance, assume that each register in the control register bank 262 stores one byte of data. If the start-address specifies a register address of 5 and the byte-count-N specifies a value of 3, this command would direct preamplifier circuitry 130 to store byte 1 in the register of address 5, and store the remaining register data byte 2 and byte 3 the contents of the next two sequential registers 6 and 7.

When certain register data is to be read from the control register bank 262 in the preamplifier circuitry 130, the master serial port control circuitry 112 inserts the direction switch control character 412 into the "outbound" serial data stream 400-1 to signal a direction switch to the slave serial port control circuitry 132. More specifically, in one embodiment of the invention, the insertion of the direction control character 412 is initiated in response to the assertion (logic "1") of a Flag Bit (i.e., 9th bit) appended to a given 8-bit character that is stored in the FIFO circuitry 228 by the hard disk controller 102. The asserted Flag Bit serves an indicator to the control logic circuitry 234 that an "inbound" transfer of register data, for example, is sought from the preamplifier circuitry 130. For example, in one embodiment, the 8-bit character (having an asserted Flag Bit (9th bit)) specifies the address of a register within the control register bank 262 having register data that is to be accessed and transmitted to the hard disk controller 102. When the control logic circuitry 234 detects an asserted Flag Bit of a given 8-bit character in the FIFO circuitry 228, the control logic circuitry 234 issues a command to the encoder circuitry 230 to generates a 10-bit "direction switch" control character (which is shown as direction switch character 412 in FIG. 4). Furthermore, as shown in the embodiment of FIG. 4, the direction switch control character 412 is followed by a 10-bit 8B/10B encoded register read-address character 414 and a byte count character 416.

In the preamplifier circuitry 130, the decoder circuitry 244 decodes and detects the direction switch control character 412 received from the master serial port control circuitry 112, and outputs a detection control signal to the control logic circuitry 240. In response to the detection control signal, the control logic circuitry 240 knows that the next incoming characters in the "outbound" serial bit stream 400-1 include a read address character 414 and a byte count character 416. Consequently, the control logic circuitry 240 issues commands to access the contents of the specified register(s) and to initiate a serial port direction switch to enable transmission of the accessed register contents in an "inbound" serial bit stream to be transmitted from the preamplifier circuitry 130.

In one embodiment of the invention, the read address control character 414 serves as a register read command and includes register address data that specifies an address of the register from which data (or a pointer to another register) is to be read. In addition, the byte count character 416 specifies a number of consecutive register addresses to access starting with the specified register address. For instance, if the read address character 414 specifies a register address of 5 and the byte count character 416 specifies a value of 3, then the preamplifier circuitry 130 will access and read the contents of the register with address 5, and the contents of the next two sequential registers 6 and 7. A byte count value of 1 indicates that only the contents of the register of the register address specified by the read address character 414 is to be accessed and returned to the hard disk controller 102.

During the transmission of the outbound serial bit stream 400-1, the PLL circuitry 238 in the preamplifier circuitry 130 remains locked in phase to the serial bit stream received on the bidirectional serial data line 202-1. As shown in FIG. 4, at time t1, immediately after the read-address and byte count characters 414 and 416 are transmitted, the control logic circuitry 234 in the master serial port control circuitry 112 causes the direction control signal 440 to transition to a logic 0 level, whereby the master serial port control circuitry 112 ceases to transmit outbound serial bit streams, and relinquishes control of the bidirectional serial data line 202-1.

In addition, at time t1, immediately after the read-address and byte count characters 414 and 416 are transmitted, the control logic circuitry 240 in the slave serial port control circuitry 132 causes the HOLD control signal 430 to transition to a logic 1 level (asserted). The assertion of the HOLD control signal 430 causes the PLL circuitry 238 to suspend phase/frequency corrections and output a static clock signal CLK2 having a phase and frequency that is generated at an output of a voltage controlled oscillator of the PLL circuitry 238, which freewheels at a nominal baud rate of the previously received outbound serial bit stream 400-1. In this state, the static clock signal CLK2 provides a reference for the "inbound" serial data stream 400-2 that is to be transmitted from the preamplifier circuitry 130 to the hard disk controller 102.

During a time period from t1 to t2 shown in FIG. 4, the slave serial port control circuitry 132 performs certain sequencing operations (under control of the control logic circuitry 240) using the static clock signal CLK2 output from the PLL circuitry 238 to obtain the requested register data (from the control register bank 262) for transmission over the bidirectional serial data line 202-1 to the hard disk controller 102. Once the requested register data is accessed, encoded and serialized (via the encoder and serializer circuitries 248 and 246), at time t2, the control logic circuitry 240 causes the direction control signal 450 to transition to a logic 0 level, whereby the slave serial port control circuitry 132 assumes control of the bidirectional serial data line 202-1 and begins to transmit the "inbound" serial bit stream 400-2 to the master serial port control circuitry 112.

In the embodiment of FIG. 4, the "inbound" serial bit stream 400-2 comprises a synchronization pattern 418 and encoded data characters 420 and 422. The synchronization pattern 418 is optionally used in the master serial port control circuitry 112 to cause a phase/frequency "pull-in" of the PLL circuitry 218. As noted above, during an "inbound" transfer, the switching circuitry 220 is controlled by the direction control signal (+D/−D) to selectively apply the "inbound" serial bit stream to the reference input of the PLL circuitry to thereby generate a clock signal CLK1 that is used for receiving and decoding the inbound serial bit stream transmitted from the preamplifier circuitry 30 over the bidirectional serial data line 202-1. In one embodiment, the synchronization pattern 418 comprises a bit pattern that is used as a reference signal by the PLL circuitry 218 to generate a clock signal CLK1 that is phase locked to the "inbound" serial bit stream 400-2.

In one embodiment of the invention, the synchronization pattern 418 can be a single 8B/10B control character when the PLL circuitry 218 in the master serial port control circuitry 112 is implemented using a digital PLL framework that is configured for near-instantaneous "pull-in" using well known techniques. By way of example, the PLL circuitry 218 can be implemented using a digital asynchronously-sampled instant-pull-in PLL framework, which enables near instantaneous phase-lock to the "inbound" serial bit stream for gigabit-rate clock and data recovery applications.

In the example embodiment shown in FIG. 4, the encoded data characters 420 and 422 of the 'inbound" serial bit stream 400-2 include register data which is accessed from two different registers, encoded to 8B/10B 10-bit characters using the encoder circuitry 248, and then serialized using the serializer circuitry 246 under sequencing control of the static clock signal CLK2 output from the "frozen" PLL circuitry 238. During the time period from t2 to t3 in FIG. 3, the encoded data characters 420 and 422 are inbound serially transmitted to the master serial port control circuitry 112, wherein the serial bit stream is deserialized by the deserializer circuitry 226, decoded into 8-bit bytes by the decoder circuitry 224, and stored in the "inbound" data FIFO circuitry 222 for subsequent access by the hard disk controller 102.

In the embodiment shown in FIG. 4, at time t3 following transmission of the inbound serial bit stream 400-2, the control logic circuitry 240 in the slave serial port control circuitry 132 causes the direction control signal 450 to transition to a logic 1 level, whereby the slave serial port control circuitry 132 relinquishes control of the bidirectional serial data line 202-1. Since, the slave serial port control circuitry 132 knows a priori how may bits of information will be transmitted (blocks 420 and 422) in response to the previously received outbound request (blocks 414 and 416), the slave serial port control circuitry 132 can immediately relinquish control of the bidirectional serial data line 202-1 after the last bit of the "inbound" serial bit stream 400-2 is transmitted.

During a time from t3 to t4, the master serial port control circuitry 112 operates to complete the processing of the "inbound' serial bit stream 400-2 and prepares for another outbound transmission. At time t4, the control logic circuitry 240 in the slave serial port control circuitry 132 causes the HOLD control signal 430 to transition to a logic 0 level, thereby enabling the phase/frequency correction operations of the PLL circuitry 238. In addition, at time t4, the control logic circuitry 234 in the master serial port control circuitry 112 causes the direction control signal 440 to transition to a logic 1 level, whereby the master serial port control circuitry 112 assumes control of the bidirectional serial data line 202-1. Moreover, the assertion of the direction control signal 440 causes the switching circuitry 220 to selectively apply the bit rate clock Bit_Clock as a reference clock signal REF to the PLL circuitry 218.

As further depicted in FIG. 4, at time t4, the master serial port control circuitry begins transmission of the "outbound" serial bit stream 400-3 to the preamplifier circuitry 130. In the example embodiment, the "outbound" serial bit stream comprise a synchronization pattern 424 and a sequence of encoded register address and register data character pairs 426, 428, similar to the "outbound" serial bit stream 400-1 as discussed above.

In this state, assuming negligible "phase slip" by the preamplifier PLL circuitry 238 during the "Hold" state, the PLL circuitry 238 may be ready immediately at time t4 to use the clock signal CLK2 to deserialize and decode the "outbound" encoded characters 426 and 428. In such instance, the phase/frequency of the clock signal CLK2 would be presumably similar to the phase/frequency of the clock signal CLK1 (which is based on the bit rate clock signal Bit_Clock) as used in the master serial port control circuitry 112 starting at time t4 to encode and serialize the encoded characters 426 and 428. This presumption is valid given that the clock signal CLK2, which was held in a static state during the period from t1 to t4, was previously locked in phase to the clock signal CLK1 used to encode and serialize the previous outbound serial bit stream 400-1.

However, if a relatively large amount of "inbound" characters were transmitted from the preamplifier circuitry 130, resulting in significant a phase slip by the PLL circuitry phase slip during the Hold mode, then at time t4, the synchronization pattern 424 (similar to the synchronization patter 402) can be can be transmitted to synchronize phase/frequency of the clock signal CLK2 to the nominal baud rate of clock signal CLK1 currently used to transmit the outbound serial bit stream 400-3. In other embodiments, a phase shift of approximately less than ¼ bit-time relative to the state of the PLL circuitry 238 at the end of the previous outbound transfer 400-1 can be sued to synchronize the clock signals CLK1 and CLK2. If this tolerance cannot be maintained, it is possible to prefix a phase-trim field to the resumed outbound stream 400-3.

Figure 5:
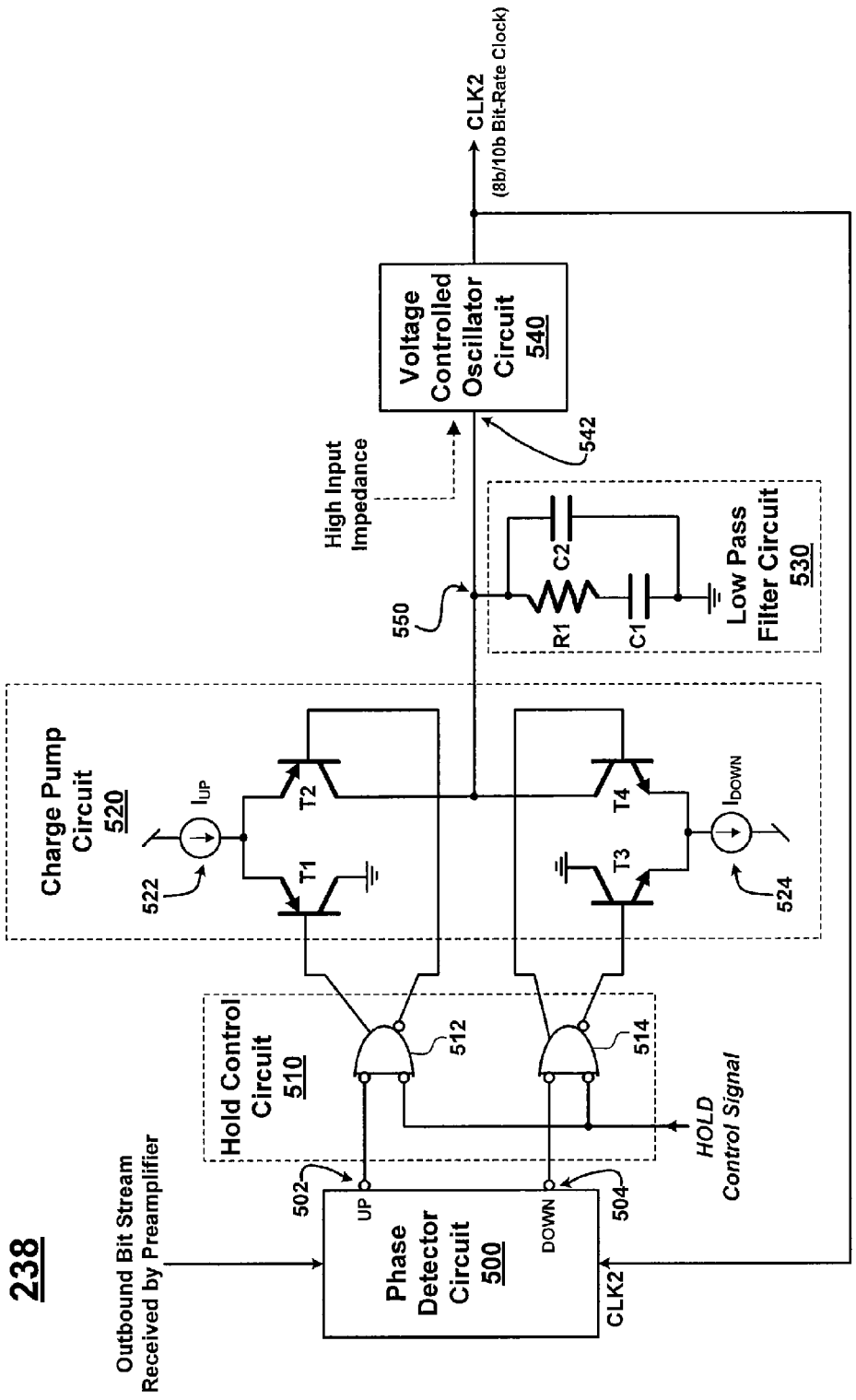
FIG. 5 schematically illustrates an embodiment of a phase locked loop circuit that can be implemented in a preamplifier to support serial port communication between a controller and the preamplifier using a single bidirectional serial data line, according to an embodiment of the invention.

FIG. 5 schematically illustrates an embodiment of a phase-locked loop circuit that can be implemented in a preamplifier to support serial port communication between a controller and the preamplifier over a single bidirectional serial data line, according to an embodiment of the invention. For example, FIG. 5 illustrates an embodiment of the PLL circuitry 238 that is implemented in the slave serial port control circuitry 132 shown in FIG. 2. As depicted in FIG. 5, the PLL circuitry 238 comprises a phase detector circuit 500, a hold control circuit 510, a charge pump circuit 520, a low pass filter circuit 530, and a voltage controlled oscillator (VCO) circuit 540. As noted above, in one embodiment of the invention, the PLL circuitry 238 is implemented using an analog PLL framework in instances where the preamplifier circuitry 130 is implemented using a process technology that is optimized for transmission and/or processing of analog signals. For example, the PLL circuitry 238 can be implemented using bipolar devices, or CMOS devices, or a mixture of bipolar and CMOS devices, for example.

The hold control circuit 510 comprises a first control gate 512 and a second control gate 514. In one embodiment, the control gates 512 and 514 are implemented as "OR-NOR" gates which are configured to enable or disable the charge pump circuit 520 based on a logic level of a HOLD control signal input to the hold control circuit 510. The charge pump circuitry 520 comprises a first current source 522 (which generates a source current $I_{UP}$), a second current source 524 (which generates a sink current $I_{DOWN}$), bipolar transistors T1, T2, T3 and T4, implementing a current-switch charge pump framework. In one embodiment as shown in FIG. 5, the bipolar transistors T1 and T2 are PNP transistors and the bipolar transistors T3 and T4 are NPN transistors. The low pass filter circuit 530 is connected to an output node 550 of the charge pump circuitry 520. In one embodiment, the low pass filter circuit 530 is a proportional-integral +HF pole compensating network comprising a resistor R1 and capacitors C1 and C2. The VCO circuit has high input impedance control port 542 which is connected to the output node 550 of the charge pump circuitry 520.

As further depicted in FIG. 5, each control gate 512 and 514 has an input port configured to receive the HOLD control signal (which is generated and output from the control logic circuitry 240 as shown in FIG. 2). In addition, the first control gate 512 has an input port which is connected to the output port 502 of the phase detector circuit 500 and configured to receive a control signal UP that is generated and output from the phase detector circuit 502. Similarly, the second control gate 514 has an input port which is connected to the output port 504 of the phase detector circuit 500 and configured to receive a control signal DOWN that is generated and output from the phase detector circuit 500.

In addition, the first control gate 512 has a first output port (NOR output) which is connected to a base terminal of the bipolar transistor T1, and a second output port (OR output) which is connected to a base terminal of the bipolar transistor T2. The second control gate 514 has a first output port (NOR output) which is connected to a base terminal of the bipolar transistor T4, and a second output port (OR output) which is connected to a base terminal of the bipolar transistor T3. In one embodiment of the invention, the input ports of the first and second control gates 512 and 514 are inverting inputs, as depicted by the "dotted" inputs of the first and second control gates 512 and 514 shown in FIG. 5.

During "outbound" transmission of digital signals over the bidirectional serial data line 202-1, the hold control circuit 510 enables operation of the charge pump circuit 520 so that the PLL circuitry 238 can perform phase/frequency corrections to generate a clock signal CLK2 that remains locked in phase to the "outbound" serial bit stream received over the bidirectional serial data line 202-1. In particular, the phase detector circuit 500 receives as input an "outbound" serial bit stream (which is received by the preamplifier circuitry 130 over the bidirectional serial data line 202-1) and a clock signal CLK2 which is generated and output from the VCO circuit 540. The phase detector circuit 530 is configured to generate and output pulsed control signals UP and DOWN at respective output ports 502 and 504 of the phase detector circuit 530. In general, the phase detector circuit 500 is configured to generate the control signals UP and DOWN based on a phase difference between the received serial bit stream and the clock signal CLK2 using any suitable phase detector circuit framework. In one embodiment, the relative pulse width of control signals UP and DOWN is proportional to a phase difference between the received serial bit stream and the clock signal CLK2, as detected by phase detector circuit 500. Moreover, in one embodiment of the invention, the control signals UP and DOWN are deemed asserted at a logic "0" level, as indicted by the dotted output ports 502 and 504 of the phase detector circuit 500.

During an "outbound" transmission, the HOLD control signal, which is input to the hold control circuit 510, is maintained at a logic 0 level. In this state, at least one inverting input of the first and second control gates 512 and 514 is held at a logic 1 level, causing the NOR output of the first control gate 512 to be maintained at a logic 1 level, and causing the OR output of the second control gate 514 to be maintained at a logic 0 level. As such, during an "outbound" transmission, the bipolar transistors T1 and T3 of the charge pump circuit 520 are maintained in an OFF state.

Furthermore, during an "outbound" transmission, the hold control circuit 510 receives the control signals UP and DOWN from the phase detector circuit 500, and activates or deactivates the bipolar transistors T2 and T4 of the charge pump circuit 520 depending on the logic levels of the UP and DOWN control signals. For example, when the UP control signal is asserted with a logic 0 level (and the HOLD control signal is logic 0), the OR output of the first control gate 512 will be at a logic 0 level, thereby causing the bipolar transistor T2 to turn ON. On the other hand, when the UP control signal is at a logic 1 level (and the HOLD control signal is logic 0), the OR output of the first control gate 512 will be at a logic 1 level, thereby causing the bipolar transistor T2 to turn OFF. Similarly, when the DOWN control signal is asserted with a logic 0 level (and the HOLD control signal is logic 0), the NOR output of the second control gate 514 will be at a logic 1 level, thereby causing the bipolar transistor T4 to turn ON. On the other hand, when the DOWN control signal is at a logic 1 level (and the HOLD control signal is logic 0), the NOR output of the second control gate 514 will be at a logic 0 level, thereby causing the bipolar transistor T4 to turn OFF.

In this regard, when the charge pump circuit 520 is enabled during an "outbound" transmission, the charge pump circuit 520 will charge/discharge the voltage at the output node 550 using the first current source 522 and/or the second current source 524 based on the logic levels of the control signals UP and DOWN. In particular, when the UP control signal is set to a logic 0 level, the bipolar transistor T2 is activated, which causes the first current source 522 to be connected to the output node 550 and thereby charge up the output node 550 using the source current $I_{UP}$. Similarly, when the DOWN control signal is set to a logic 0 level, the bipolar transistor T4 is activated, which causes the second current source 524 to be connected to the output node 550 and thereby discharge the output node 550 (inject negative charge at node 550) suing the sink current $I_{DOWN}$.

The charge injected by charge pump circuit 520 into the output node 550 is filtered by the low pass filter circuit 530 to generate a control voltage at node 550 which is input to the control input 542 of the VCO circuit 540. The VCO circuit 540 generates the output clock signal CLK2 having a frequency based on the level of the control voltage applied to the control input port 542 of the VCO circuit 540. The clock signal CLK2 is fed back to the phase detector circuit 500 using a feedback loop. During operation of the PLL circuitry 238, if clock signal CLK2 is not phase aligned with received serial bit stream, the phase detector circuit 500 will generate the UP and DOWN control signals to adjust the voltage level at the output node 550 accordingly until the output clock signal CLK2 is phase aligned (i.e., phase-locked) to the received serial bit stream. Once the clock signal CLK2 is phase aligned to the received serial bit stream, the clock signal CLK2 is used to control sequence operations in the slave serial port control circuitry 132, as discussed above.

On the other hand, during an inbound transmission where the preamplifier assumes control of the bidirectional serial data line 202-1, the HOLD control signal, which is input to the hold control circuit 510, transitions to a logic 1 level. In this state, at least one inverting input of the first and second control gates 512 and 514 is held at a logic 0 level, causing the OR output of the first control gate 512 to be maintained at a logic 1 level, and causing the NOR output of the second control gate 514 to be maintained at a logic 0 level. As such, during an inbound transmission, the bipolar transistors T2 and T4 of the charge pump circuit 520 are maintained in an OFF state, preserving the voltage level on the output node 550 as it existed just prior to assertion of the HOLD control signal. In this "hold" state, the charge pump circuit 520 is disabled to suspend phase/frequency corrections, and the control voltage on the output node 550, which is applied to the control input port 542 of the VCO circuit 540, remains constant. Accordingly, the VCO circuit 540 outputs a constant (static) clock signal CLK2 based on the control voltage at node 550. In one embodiment of the invention, the control input 542 of the VCO circuit 540 is designed to have a high input impedance to maintain the voltage level at the node 550 during the "hold" state.

Figure 6:
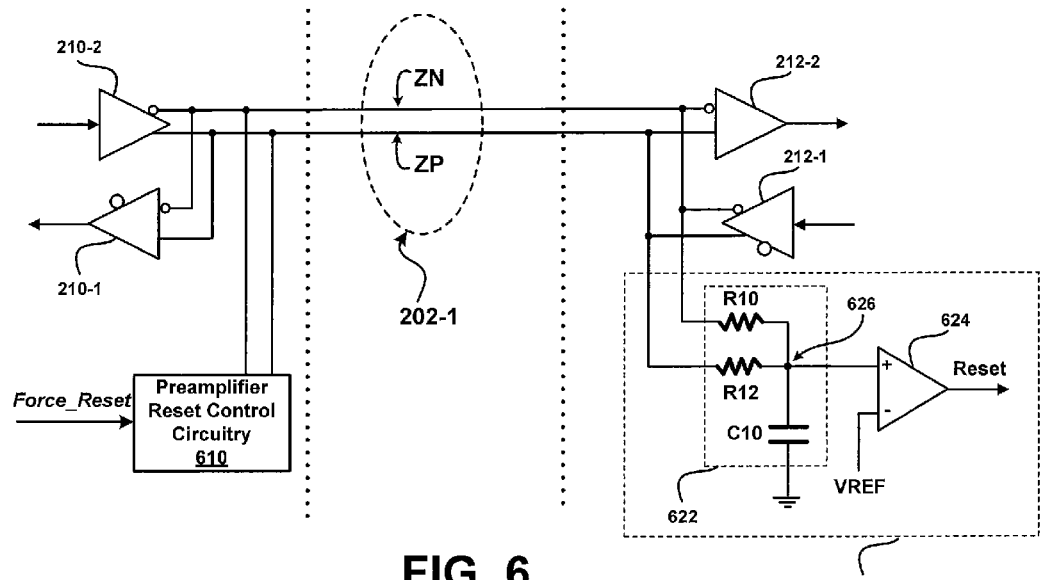
FIG. 6 is a schematic circuit diagram showing reset circuitry to force a reset of a preamplifier, according to an embodiment of the invention.
Figure 7:
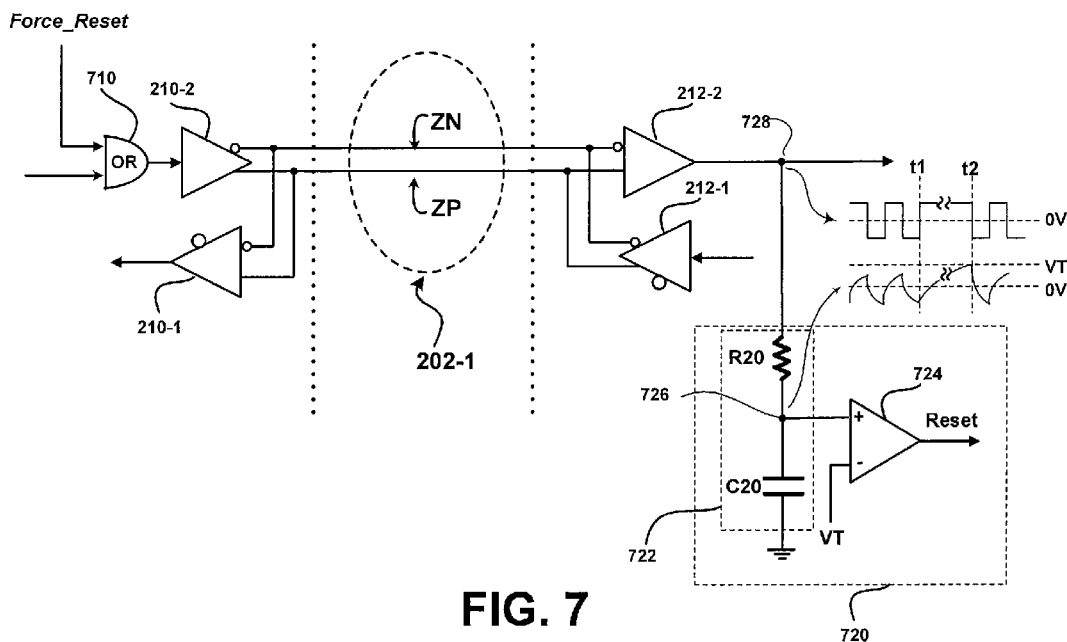
FIG. 7 is a schematic circuit diagram showing reset circuitry to force a reset of a preamplifier, according to another embodiment of the invention.

As discussed above with reference to FIG. 2, the master/slave serial port control circuitry 112/132 comprises preamplifier reset control circuitry 236 and 250 to implement a forced resetting of the preamplifier circuitry 130 based on a Force_Reset control signal that is generated by, e.g., the hard disk controller 102. For example, a forced reset of the preamplifier circuitry 130 is desired for recovery from lockup conditions, or to force an immediate error recovery, for example. FIGS. 6 and 7 schematically illustrate methods for resetting a preamplifier according to alternate embodiments of the invention.

In particular, FIG. 6 is a schematic circuit diagram showing reset circuitry to force a reset of a preamplifier, according to an embodiment of the invention. The preamplifier reset scheme depicted in FIG. 6 is based on the pulsing of a common-mode voltage on a differential serial data line to a level outside of a normal operating range of the common-mode voltage. In general, FIG. 6 illustrates a CML implementation of the bidirectional serial data line 202-1 and the line multiplexing circuitry 210/212 of the master/slave serial port control circuitry 112/132 of FIG. 2. The bidirectional serial data line 202-1 is depicted as a differential transmission line comprising a differential pair (ZP, ZN). Moreover, the various line drivers/receivers 210-1, 210-2, 212-1, and 212-2 are depicted as differential line drivers/receivers. For example, the line drivers/receivers 210-1, 210-2, 212-1, and 212-2 can be implemented as differential amplifiers have a resistor-loaded CML amplifier topology, which drives a common mode voltage on the differential line (ZP, ZN) to enable differential signal communication over the bidirectional serial data line 202-1.

Furthermore, FIG. 6 illustrates embodiments of preamplifier reset control circuitry 610 implemented in the master serial port control circuitry 112, and preamplifier reset control circuitry 620 implemented in the slave serial port control circuitry 132. The preamplifier reset control circuitry 610 is configured to temporarily change a level of the common mode voltage of the differential pair (ZP, ZN) in response to the assertion of the Force_Reset control signal. In one embodiment, the preamplifier reset control circuitry 610 is implemented using first and second switch circuits and associated first and second tail current sources, wherein the first and second switch circuits are transmission gates that are controlled by the Force_Reset control signal to cause a change (e.g., increase) in the common mode voltage on the differential line (ZP, ZN) due to a voltage generated across load resistors of the CML drivers 210-1 and 210-2 by virtue of the current sources being temporarily connected to the respective differential signal lines ZP and ZN.

The preamplifier reset control circuitry 620 (in the slave serial port control circuitry 132) is configured to detect the change in common mode voltage and output a Reset control signal to the preamplifier circuitry 130 to initiate a reset of the preamplifier circuitry 130. In particular, as shown in FIG. 6, the preamplifier reset control circuitry 620 comprises a low pass filter 622 and a comparator 624. The low pass filter 622 comprises resistors R10, R12, and a capacitor C10. The comparator 624 has a first (non-inverting) input connected to a node 626 of the low pass filter 622, and a second (inverting) input that is configured to receive a reference voltage VREF. The references voltage VREF is selected to be at a level $$VREF = \frac{VZN + VZP}{2} + \Delta V, \text{ wherein} \frac{VZN + VZP}{2}$$

is the normal operating common-mode voltage level of the differential pair (ZP, ZN) and wherein $\Delta V$ denotes a change in the common-mode voltage, which when detected, causes a reset of the preamplifier circuitry 130. In operation, voltage at node 626 is maintained at the common-mode voltage of the differential pair (ZP, ZN). When the common-mode voltage increases above (or decreases below) the reference level VREF, the comparator 624 is triggered, and a Reset control signal is generated at the output of the comparator 624. The low pass filter 622 improves noise immunity in the detection process. The preamplifier reset operation can be used to prepare the preamplifier circuitry 130 to receive an "outbound" serial bit stream.

FIG. 7 is a schematic circuit diagram showing reset circuitry to force a reset of a preamplifier, according to another embodiment of the invention. The preamplifier reset scheme depicted in FIG. 7 is based on a control scheme of forcing a run-length violation by maintaining a logic level on the bidirectional serial data line for a predetermined period of time, and detecting the run-length violation to initiates a preamplifier reset operation. In an embodiment where 8B/10B encoding is implemented, run-length violation is achieved by forcing a span of no-transitions on the bidirectional serial date line 202-1 for some period of time that is longer than the maximum span allowed under the 8B/10B encoding rules.

In general, FIG. 7 is similar to FIG. 6 in that FIG. 7 illustrates a CML implementation of the bidirectional serial data line 202-1 and line multiplexing circuitry 210/212 of the master/slave serial port control circuitry 112/132 of FIG. 2, wherein the bidirectional serial data line 202-1 is depicted as a differential transmission line comprising a differential pair (ZP, ZN), and the line drivers/receivers 210-1, 210-2, 212-1, and 212-2 are depicted as differential line drivers/receivers.

Moreover, FIG. 7 illustrates embodiments of preamplifier reset control circuitry 710 implemented in the master serial port control circuitry 112, and preamplifier reset control circuitry 720 implemented in the slave serial port control circuitry 132. The preamplifier reset control circuitry 710 comprises an OR gate 710 having a first input configured to receive a Force_Reset control signal and a second input configured to receive an "outbound" serial bit stream that is to be transmitted over the bidirectional serial data line 202-1. When the Force_Reset control signal is asserted at a logic 1 level, the output of the OR gate 710 will remain at a logic 1 level, regardless of the logic level of the data bits of the serial bit stream input to the OR gate 710. As such, a logic level on the bidirectional serial data line will be maintained at a logic 1 level for a predetermined period of time in which the Force_Reset control signal remains asserted, causing a run length violation on the bidirectional serial data line. In one embodiment where 8B/10B encoding is used to transmit serial bit streams on the bidirectional serial data line 202-1, the Force_Reset control signal remains asserted for a given period of time that results in a significant violation of the d,k=0,4 run-length constraint of the encoded serial bit stream transmitted on the bidirectional serial data line 202-1.

The preamplifier reset control circuitry 720 (in the slave serial port control circuitry 132) is configured to detect a run-length violation in the received serial bit stream and output a Reset control signal to the preamplifier circuitry 130 to initiate a reset of the preamplifier circuitry 130. In particular, as shown in FIG. 7, the preamplifier reset control circuitry 720 comprises a low pass filter 722 and a comparator 724. The low pass filter 722 comprises resistor R20 and a capacitor C20. The comparator 724 has a first (non-inverting) input connected to a node 726 of the low pass filter 722, and a second (inverting) input that is configured to receive a threshold voltage VT. The comparator 724 is configured to compare a voltage on node 726 of the low pass filter 722 with the threshold voltage VT to determine when a run-time violation occurs.

In particular, FIG. 7 illustrates an example waveform that is generated at node 728, i.e., the output of the driver 212-2, as well as an example waveform that is generated at the node 726 in response to the waveform at node 728. As shown in FIG. 7, a logic level at the output node 728 of the driver 212-2 is maintained at a logic 1 level during a time period t1 through t2 (in response to the assertion of the Force_Reset control signal from time t1 through t2), which causes the voltage at node 726 to rise to the threshold voltage VT. When the voltage on node 726 rises to the VT level, the comparator 724 is triggered, and a Reset control signal is generated at the output of the comparator 724. In effect, the preamplifier reset control circuitry 720 functions as an asynchronous timer, wherein each time a rising edge occurs in the received serial bit stream, the asynchronous timer is reset, and when the asynchronous timer overflows (i.e., the voltage on node 726 reaches the threshold voltage VT), it is assumed that a forced run-time violation has occurred to initiate reset of the preamplifier circuitry 130. The low pass filter 722 improves noise immunity in the detection process.

It is to be understood that in other embodiments of the invention, the data storage device as depicted in FIGS. 1 and 2 can be modified to include other frameworks for implementing the analog bus 200 and digital bus 202 and bit significant lines 204 to support communication between the various components of the data storage device. For example, while FIG. 2 illustrates the analog bus 200 implemented with unidirectional signal lines 200-1, 200-2, 200-2 and 200-4, the analog bus 200 can be implemented as a multiplexed, bidirectional analog bus using circuits and methods as disclosed in commonly owned U.S. patent application Ser. No. 14/267,354, entitled "Multiplexed Communication In A Storage Device", filed on May 1, 2014, the disclosure of which is incorporated herein by reference. For example, this application describes an analog bus framework in which a plurality of signal lines of an analog bus are controlled by multiplexing circuitry, wherein the multiplexing circuitry controls bidirectional transmission of read and write information signals between recording channel circuitry and preamplifier circuitry over one or more signal lines of the analog bus. The multiplexed analog bus framework allows read data signals to be transmitted in one direction over a read signal line during a read operation, while allowing write control signals, for example to be transmitted in an opposite direction over the same read signal line during a write operation.

In another embodiment of the invention, one of more control signals that are transmitted on the bit significant lines 204 can be transmitted between the hard disk controller 102 and the preamplifier circuitry 130 on the bidirectional serial data line 202-1 under control of the master/slave serial port control circuitry 112/132. For example, one or more bit significant control signals can be transmitted on the serial port using, for example, circuits and methods as disclosed in U.S. patent application Ser. No. 13/650,474, filed on Oct. 12, 2012, entitled Preamplifier-To-Channel Communication in a Storage Device, and U.S. patent application Ser. No. 13/719,615, filed on Dec. 19, 2012, entitled Tag Multiplication Via A Preamplifier Interface. These patent applications describe methods and control circuitry that can be incorporated within the master/slave port control circuits 112/132 of FIG. 2, to generate and merge bit significant signals within a serial port framework as discussed herein. In general, U.S. patent application Ser. No. 13/650,474 discloses methods for merging bit significant signals onto a unified high-speed serial port. Moreover, U.S. patent application Ser. No. 13/719,615 discloses methods for generating additional bit significant signals within the preamplifier circuitry without the need for additional signaling wires. These applications are commonly assigned and fully incorporated herein by reference.

In other embodiments of the invention, the bidirectional serial data line 202-1 of the serial port is implemented using one or more of the signal lines 200-1, 200-2, 200-3, 200-4 of the an analog bus 200, which are used by the recording channel circuitry 110 and the preamplifier circuitry 130 to perform data access operations with the storage medium 170. In such embodiments, the storage device further comprises multiplexing circuitry that is configured to enable sharing of the one or more signal lines of the analog bus 200 with the master/slave serial port control circuitry 112/132 during periods of time in which the one or more signal lines are not being utilized to perform a data access operation with the storage medium 170. Illustrative embodiments of the invention in this regard will now be described in further detail with reference to FIGS. 8 and 9, for example.

Figure 8:
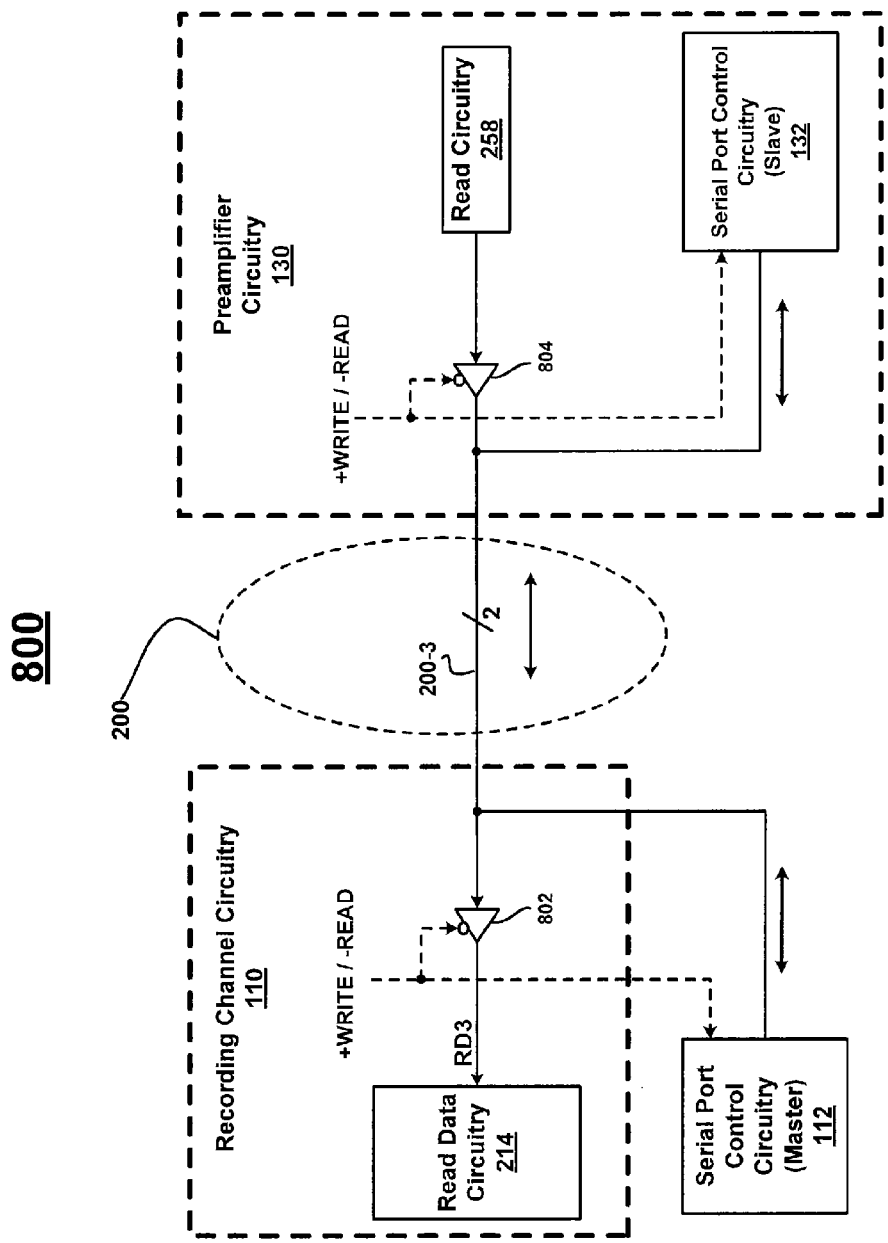
FIG. 8 schematically illustrates a data storage device having control circuitry to support serial port communication between a controller and a preamplifier using a signal line of an analog bus as a bidirectional serial data line, according to an embodiment of the invention.

FIG. 8 schematically illustrates a data storage device having control circuitry to support serial port communication between a controller and a preamplifier using a signal line of an analog bus to implement a bidirectional serial data line for a serial port, according to an embodiment of the invention. In particular, FIG. 8 illustrates a data storage device 800, which is similar to the embodiment of FIG. 2, except that the bidirectional serial data line 202-1 of FIG. 2 is implemented using a read data signal line (e.g., signal line 200-3) of the analog bus 200. In the embodiment of FIG. 8, the read signal line 200-3 serves as a unidirectional line for transmission of read data RD3 from the read circuitry 258 (of the preamplifier circuitry 130) to the read data circuitry 214 (of the recording channel circuitry 110) during a read operation of the storage device 800. Furthermore, the read signal line 200-3 serves as a bidirectional serial data line for transmission of serial bit streams between the master/slave serial port control circuitry 112/132, using protocols described above.

In the example embodiment of FIG. 8, the read signal line 200-3 comprises a line receiver 802 and a line driver 804 (e.g., CML differential amplifiers) that are controlled (enabled/disabled) by a write gate control signal (+WRITE/−READ) to connect or disconnect the read signal line 200-3 from the read data circuitry 214 and the read circuitry 258. In addition, the write gate control signal (+WRITE/−READ) is applied to the master/slave serial port control circuitry 112/132 to control the line multiplexing circuitry 210/212 within the master/slave serial port control circuitry 112/132 to connect or disconnect the master/slave serial port control circuitry 112/132 from the read signal line 200-3. In one embodiment, the write gate control signal (+WRITE/−READ) is used by the master/slave serial port control circuitry 112/132 to control the line multiplexing circuitry 210/212 depending on whether a read operation or write operation is being executed.

Collectively, the line receiver and driver 802 and 804 and line multiplexing circuitry 210/212 comprise multiplexing circuitry that is controlled by the write gate control signal (+WRITE/−READ) to disconnect the master/slave serial port control circuitry 112/132 from the read signal line 200-3 during a read operation, and to connect the master/slave serial port control circuitry 112/132 to the read signal line 200-3 during a write operation. In particular, during a read operation, the line receiver and driver 802 and 804 are activated in response to the write gate control signal (+WRITE/−READ) to enable transmission of read data RD3 from the preamplifier circuitry 130 to the recording channel circuitry 110, whereas the line multiplexing circuitry 210/212 of the master/slave serial port control circuitry 112/132 is deactivated to prevent transmission of serial bit streams over the read signal line 200-3 during the read operation. Further, during a write operation, the line receiver and driver 802 and 804 are deactivated in response to the write gate control signal (+WRITE/−READ), whereas the line multiplexing circuitry 210/212 of the master/slave serial port control circuitry 112/132 is activated to enable serial port communication using the read signal line 200-3 during the write operation, using the serial port control schemes as discussed above.

In the embodiment of FIG. 8, the preamplifier circuitry 130 cannot be reconfigured during read operations as the master/slave serial port control circuitry 112/132 does not have access to the read signal line 200-3. While the embodiment of FIG. 8 illustrates the shared use of a read signal line of the analog bus 200 as a bidirectional serial data line of the serial port, in another embodiment, a write signal line (e.g., signal line 200-4) of the analog bus 200 can be used by the master/slave serial port control circuitry 112/132 as a bidirectional serial data line of the serial port. In this embodiment, the line multiplexing circuitry 210/212 of the master/slave serial port control circuitry 112/132 would be activated during read operations to enable serial port communication using the read signal line 200-3, and deactivated during write operations. As such, the preamplifier circuitry 130 could not be reconfigured during write operations.

Figure 9:
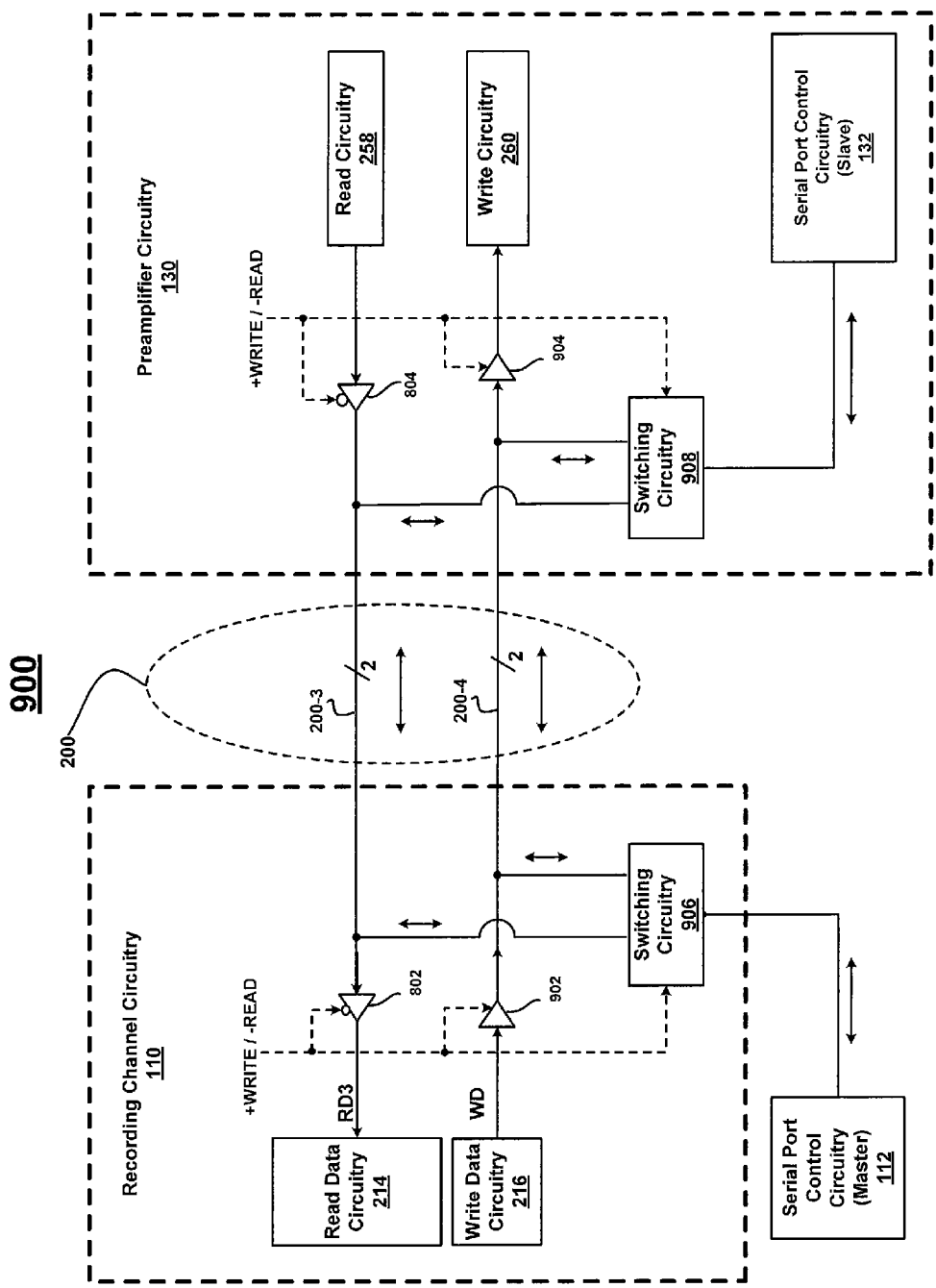
FIG. 9 schematically illustrates a data storage device having control circuitry to support serial port communication between a controller and a preamplifier using a signal line of an analog bus as a bidirectional serial data line, according to another embodiment of the invention.

FIG. 9 schematically illustrates a data storage device having control circuitry to support serial port communication between a controller and a preamplifier using a signal line of an analog bus to implement a bidirectional serial data line for a serial port, according to another embodiment of the invention. In particular, FIG. 9 illustrates a data storage device 900, which is similar to the embodiments of FIGS. 2 and 8, except that the bidirectional serial data line 202-1 of FIG. 2 is implemented using a read data signal line 200-3 of the analog bus 200 during a write operation, and using a write data signal line 200-4 of the analog bus 200 during a read operation.

In the embodiment of FIG. 9, the read signal line 200-3 serves as a unidirectional line for transmitting read data RD3 from the read circuitry 238 (of the preamplifier circuitry 130) to the read data circuitry 214 (of the recording channel circuitry 110) during a read operation of the storage device 900. Moreover, the write signal line 200-4 serves as a unidirectional line for transmitting write data WD from the write data circuitry 216 (of the recording channel circuitry 110) to the write circuitry 260 (of the preamplifier circuitry 130) during a write operation of the storage device 900. Furthermore, the read signal line 200-3 of the analog bus 200 serves as a bidirectional serial data line for transmission of serial bit streams between the master/slave serial port control circuitry 112/132 during a write operation, while the write signal line 200-4 of the analog bus 200 serves as the bidirectional serial data line for transmission of serial bit streams between the master/slave serial port control circuitry 112/132 during a read operation.

In the example embodiment of FIG. 9, similar to the embodiment of FIG. 8, the read signal line 200-3 comprises a line receiver 802 and a line driver 804 (e.g., CML differential amplifiers) that are controlled by a write gate control signal (+WRITE/−READ) to connect or disconnect the read signal line 200-3 from the read data circuitry 214 and the read circuitry 258. Similarly, the write signal line 200-4 comprises a line driver 902 and a line receiver 904 (e.g., CML differential amplifiers) that are controlled by the write gate control signal (+WRITE/−READ) to connect or disconnect the write signal line 200-4 from the write data circuitry 216 and the write circuitry 260.

Furthermore, the storage device 900 comprises switching circuitry 906 that is controlled by the write gate control signal (+WRITE/−READ) to connect the master serial port control circuitry 112 to either the read signal line 200-3 or the write signal line 200-4, depending on whether a write or read operation is being performed. Similarly, the storage device 900 comprises switching circuitry 908 that is controlled by the write gate control signal (+WRITE/−READ) to connect the slave serial port control circuitry 132 to either the read signal line 200-3 or the write signal line 200-4, depending on whether a write or read operation is being performed. In one embodiment, each switching circuitry 906 and 908 is implemented using a complementary pairs of line drivers/receivers similar to the line multiplexing circuitry 210 and 212, for example.

Collectively, the line drivers/receivers 802, 804, 902, and 904, and switching circuitry 906/908 comprise multiplexing circuitry, which is controlled by the write gate control signal (+WRITE/−READ), wherein during a read operation, the multiplexing circuitry 802/804/902/904/906/908 is configured to disconnect the master/slave serial port control circuitry 112/132 from the read signal line 200-3, and connect the master/slave serial port control circuitry 112/132 to the write signal line 200-4. Therefore, during the read operation, the master/slave serial port control circuitry 112/132 can utilize the write signal line 200-4 as a bidirectional serial data line, while read data RD3 is transmitted on the read signal line 200-3. On the other hand, during a write operation, the multiplexing circuitry 802/804/902/904/906/908 is configured to connect the master/slave serial port control circuitry 112/132 to the read signal line 200-3, and disconnect the master/slave serial port control circuitry 112/132 from the write signal line 200-4. Therefore, during the write operation, the master/slave serial port control circuitry 112/132 can utilize the read signal line 200-3 as a bidirectional serial data line, while write data WD is transmitted on the write signal line 200-4. The embodiment of FIG. 9 allows serial port transactions to occur during both read and write operations, while using signal lines of the analog bus as the bidirectional serial data line.

Figure 10:
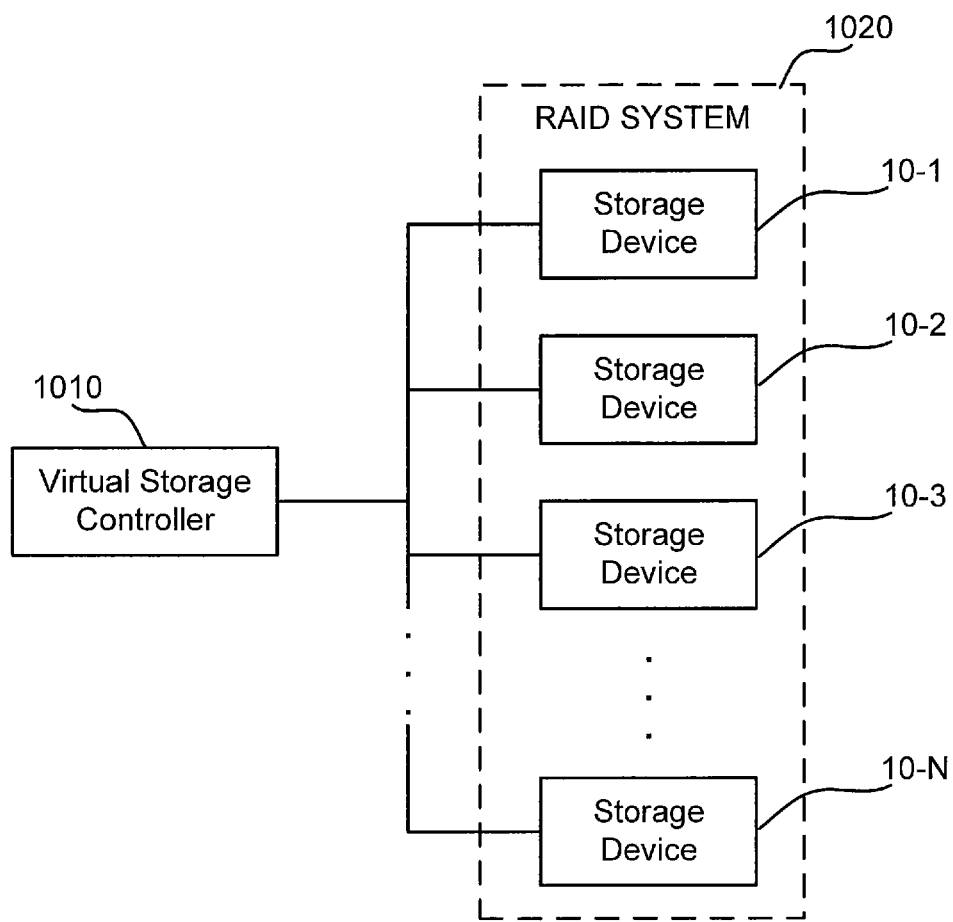
FIG. 10 is a block diagram of a virtual storage system incorporating a plurality of disk-based storage devices of the type shown in FIG. 1.

In other embodiments of the invention, multiple disk-based storage devices 10 (FIG. 1) may be incorporated into a virtual storage system as illustrated in FIG. 10. In particular, FIG. 10 is a block diagram of a virtual storage system 1000 incorporating a plurality of disk-based storage devices of the type shown in FIG. 1. The virtual storage system 1000, also referred to as a storage virtualization system, illustratively comprises a virtual storage controller 1010 coupled to a RAID system 1020, where RAID denotes Redundant Array of Independent Disks. The RAID system 1020 more specifically comprises N distinct storage devices denoted 10-1, 10-2, ..., 10-N, one or more of which are assumed to be configured to include embodiments of the storage device 10 as shown in FIG. 1 with multiplexed communication control circuitry as discussed herein. These and other virtual storage systems comprising hard disk drives or other disk-based storage devices of the type disclosed herein are considered embodiments of the invention. A host processing device may also be an element of a virtual storage system, and may incorporate the virtual storage controller 1010.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method to provide communication between a controller and a preamplifier in a storage device, comprising:
   implementing a serial port that is configured to transmit digital signals between the controller and the preamplifier over a single bidirectional serial data line; and
   controlling the serial port to selectively transmit digital signals over the bidirectional serial data line in either a first direction from the controller to the preamplifier or a second direction from the preamplifier to the controller.

2. The method of claim 1, wherein controlling the serial port comprises:
   transmitting a serial bit stream over the bidirectional serial data line from the controller to the preamplifier;
   generating a clock signal in the preamplifier using a phase-locked loop circuit, wherein the clock signal is generated based on a bit rate of the serial bit stream received by the preamplifier; and
   using the clock signal to receive and deserialize the serial bit stream received by the preamplifier.

3. The method of claim 2, wherein controlling the serial port further comprises:
   transmitting a direction switch control signal over the bidirectional serial data line to the preamplifier; and
   following detection of the direction switch control signal by the preamplifier,
      generating a control signal to suspend phase and frequency adjustments of the phase-locked loop circuit of the preamplifier and maintain a static clock signal output from the phase-locked loop circuit of the preamplifier;
      assuming control of the bidirectional serial data line by the preamplifier; and
      using the static clock signal to serialize and transmit data from the preamplifier to the controller over the bidirectional serial data line.

4. The method of claim 3, wherein transmitting a direction switch control signal to the preamplifier comprises:
   detecting an asserted flag bit that is associated with a digital signal to be transmitted from the controller to the preamplifier;
   generating and transmitting the direction switch control signal to the preamplifier over the bidirectional serial data line in response to the asserted flag bit; and
   wherein controlling the serial port further comprises transmitting the associated digital signal over the bidirectional serial data line following transmission of the direction switch control signal.

5. The method of claim 3, wherein the digital signals transmitted between the controller and the preamplifier are encoded and decoded using an 8B/1OB coding protocol, and wherein the direction switch control signal is generated as an 8B/1OB control character.

6. The method of claim 3, wherein controlling the serial port further comprises generating a clock signal in the controller using a phase-locked loop circuit in the controller based on a reference signal that is input to the phase-locked loop circuit, wherein generating the clock signal in the controller comprises:
   using a port bit rate clock signal as the reference signal to generate a clock signal that is used for encoding and serializing digital signals to be transmitted over the bidirectional serial data line from the controller to the preamplifier; and
   using a serial bit stream transmitted from the preamplifier as the reference signal to generate a clock signal that is used for deserializing and decoding the serial bit stream transmitted from the preamplifier over the bidirectional serial data line.

7. The method of claim 1, further comprising forcing a reset of the preamplifier, wherein forcing a reset comprises:
   forcing a run-length violation by maintaining a logic level on the bidirectional serial data line for a predetermined period of time; and
   the preamplifier detecting the run-length violation and initiating a reset operation.

8. The method of claim 1, further comprising forcing a reset of the preamplifier, wherein forcing a reset comprises:
   forcing an increases or decrease of a common-mode voltage on the bidirectional serial data line; and
   the preamplifier detecting the forced increase or decrease of the common-mode voltage on the bidirectional serial data line and initiating a reset operation.

9. The method of claim 1, wherein the bidirectional serial data line is a signal line of an analog bus which is used by the preamplifier and a recording channel to perform a data access operation, and wherein controlling the serial port comprises:

controlling the serial port to selectively transmit digital signals over the signal line of the analog bus in either a first direction from the controller or a second direction from the preamplifier to the controller, during periods in which the signal line is not being utilized by the preamplifier and the recording channel to perform a data access operation; and controlling the serial port to cease transmitting digital signals over the signal line of the analog bus during periods in which the signal line is being utilized by the preamplifier and the recording channel to perform a data access operation.

10. A storage device comprising:

a storage medium;

a read/write head configured to read data from and write data to the storage medium, a preamplifier configured to process data that is written to and read from the storage medium;

a controller configured to control the preamplifier; and serial port circuitry configured to transmit digital signals between the controller and the preamplifier over a single bidirectional serial data line, wherein the serial port circuitry is configured to selectively transmit digital signals over the bidirectional serial data line in either a first direction from the controller to the preamplifier or a second direction from the preamplifier to the controller.

11. The storage device of claim 10, wherein the serial port circuitry comprises:

master serial port control circuitry that is implemented by the controller; and slave serial port control circuitry that is implemented by the preamplifier, wherein the master serial port control circuitry is configured to transmit a serial bit stream over the bidirectional serial data line to the preamplifier, wherein the slave serial port control circuitry comprises a phase-locked loop circuitry that is configured to generate a clock signal based on a bit rate of the serial bit stream received by the preamplifier, wherein the slave serial port control circuitry is configured to use the clock signal to receive and deserialize the serial bit stream received by the preamplifier, wherein the master serial port control circuitry is configured to generate and transmit a direction switch control signal over the bidirectional serial data line from the controller to the preamplifier; and wherein the slave serial port control circuitry is configured to detect the direction switch control signal, and in response to detecting the direction switch control signal, the slave serial port control circuitry is configured to (i) suspend phase and frequency adjustments of the phase-locked loop circuit of the slave serial port control circuitry and output a static clock signal from the phase-locked loop circuit of the preamplifier, (ii) assume control of the bidirectional serial data line, and to (iii) use the static clock signal to serialize and transmit data from the preamplifier to the controller over the bidirectional serial data line.

12. The storage device of claim 10, wherein the bidirectional serial data line is implemented using a signal line of an analog bus, wherein the signal line is used by the preamplifier and recording channel circuitry to perform a data access operation with the storage medium, wherein the storage device comprises multiplexing circuitry configured to enable sharing of the signal line by the serial port circuitry during periods of time in which the signal line is not being utilized to perform a data access operation with the storage medium.

13. The storage device of claim 12, wherein the signal line of the analog bus is a read signal line on which read data is transmitted from the preamplifier to the recording channel circuitry during a read operation, wherein during a during a write operation, the multiplexing circuitry is configured to connect the serial port circuitry to the read signal line; and wherein during the read operation, the multiplexing circuitry is configured to disconnect the serial port circuitry from the read signal line.

14. The storage device of claim 13, wherein the read operation, the multiplexing circuit is further configured to connect the serial port control circuitry to a write signal line of the analog bus on which write data is transmitted from the recording channel circuitry to the preamplifier during a write operation, and wherein during the write operation, the multiplexing circuitry is configured to disconnect the serial port control circuitry from the write signal line.

15. A virtual storage system comprising the storage device of claim 10.

* * * * *